United States Patent
Yoshizumi

(10) Patent No.: US 8,724,018 B2
(45) Date of Patent: May 13, 2014

(54) MOVABLE-MECHANICAL-SECTION CONTROLLING DEVICE, METHOD OF CONTROLLING MOVABLE MECHANICAL SECTION, AND PROGRAM

(75) Inventor: Shingo Yoshizumi, Tokyo (JP)

(73) Assignee: Sony Corporation (JP)

( * ) Notice: Subject to any disclaimer, the term of this patent is extended or adjusted under 35 U.S.C. 154(b) by 201 days.

(21) Appl. No.: 12/802,299

(22) Filed: Jun. 3, 2010

(65) Prior Publication Data
US 2010/0328524 A1    Dec. 30, 2010

(30) Foreign Application Priority Data
Jun. 24, 2009    (JP) ................................ P2009-149873

(51) Int. Cl.
  *H04N 5/225*    (2006.01)
(52) U.S. Cl.
  USPC ........................................................ 348/373
(58) Field of Classification Search
  USPC ........................................................ 348/373
  See application file for complete search history.

(56) References Cited

U.S. PATENT DOCUMENTS

| | | | |
|---|---|---|---|
| 7,520,685 B2 * | 4/2009 | Lee ................................ | 396/427 |
| 2001/0002843 A1 | 6/2001 | Yata | |
| 2004/0223062 A1 * | 11/2004 | Pettegrew et al. ......... | 348/211.4 |
| 2007/0040894 A1 | 2/2007 | Kikugawa | |
| 2007/0236570 A1 * | 10/2007 | Sun et al. ...................... | 348/159 |
| 2008/0012980 A1 * | 1/2008 | Yamane et al. ............... | 348/373 |
| 2008/0122922 A1 * | 5/2008 | Geng .............................. | 348/39 |

FOREIGN PATENT DOCUMENTS

| | | |
|---|---|---|
| EP | 1359554 A2 | 11/2003 |
| JP | 2001-268425 A | 9/2001 |
| JP | 2004266317 A | 9/2004 |
| JP | 2007074296 A | 3/2007 |
| JP | 2007215136 A | 8/2007 |
| WO | 9906943 A1 | 2/1999 |
| WO | 9951027 A1 | 10/1999 |

OTHER PUBLICATIONS

Office Action from Japanese Application No. EP 10166166, dated Dec. 10, 2010.
Partial European Search Report EP 10166166, dated Sep. 21, 2010.
"Sony Party-shot" Internet Citation Dec. 22, 2009, pp. 1, 7-11, XP 007914772.
Office Action from Japanese Application No. 2009-149873, dated Jan. 15, 2013.

* cited by examiner

*Primary Examiner* — Anthony J Daniels
(74) *Attorney, Agent, or Firm* — Lerner, David, Littenberg, Krumholz & Mentlik, LLP

(57) ABSTRACT

A movable-mechanical-section controlling device includes a pan/tilt driving controlling unit configured to perform driving control on a movable mechanical section having a structure that moves so that an image pickup direction of an image pickup section that obtains an image-pickup image by performing an image pickup operation changes in a pan direction and a tilt direction. In the controlling device, unit pan operations that are performed in an angular range in the pan direction are performed for the respective two or more different tilt positions with decreasing angle of elevation at the tilt positions.

8 Claims, 24 Drawing Sheets

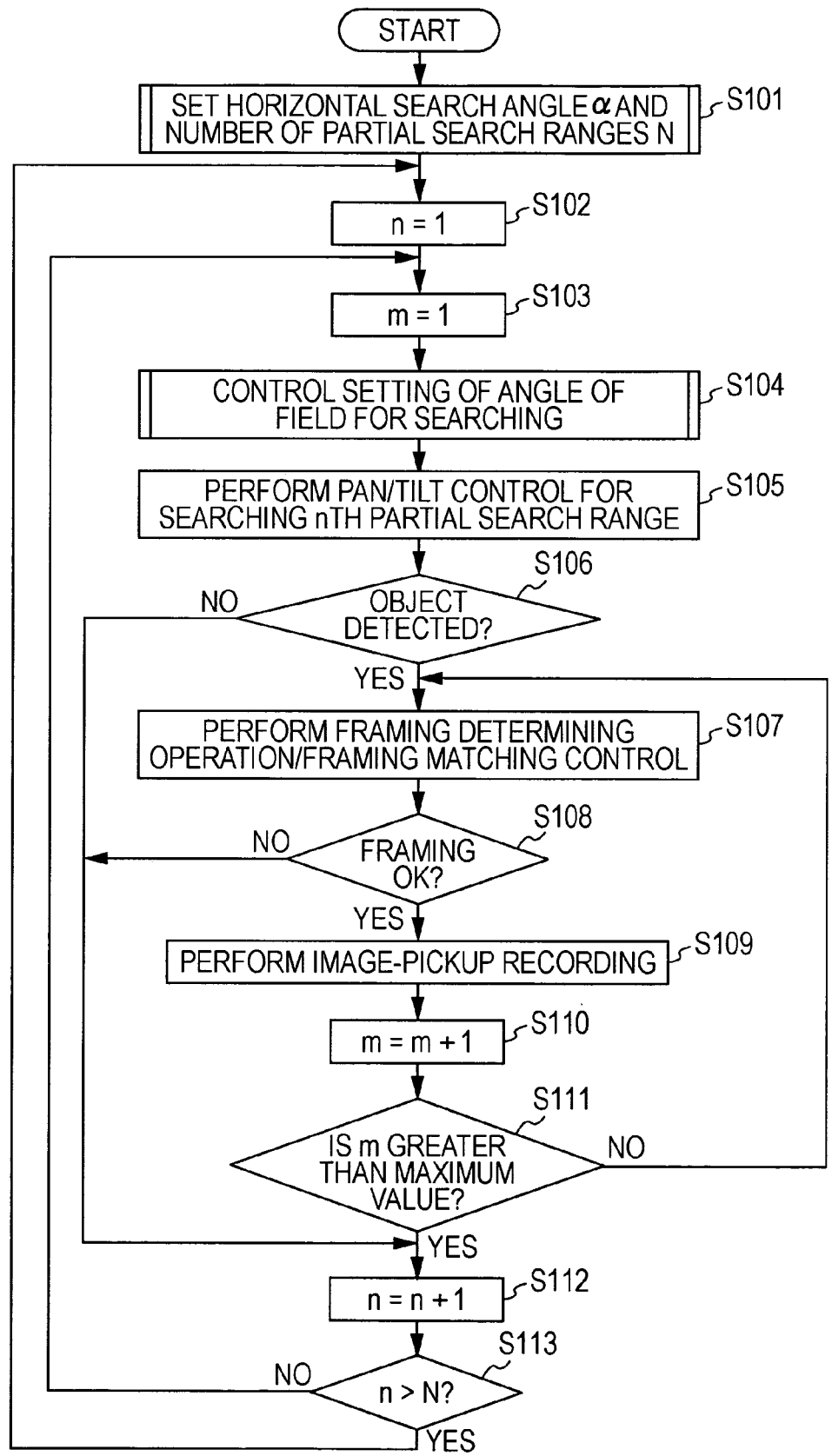

FIG. 18A
S101

```
START
   ↓
[REFER TO EFFECTIVE SEARCH RANGE
SETTING INFORMATION, AND RECOGNIZE
SET EFFECTIVE SEARCH RANGE] — S201
   ↓
[REFER TO PARAMETER TABLE FOR
EFFECTIVE SEARCH RANGES, AND OBTAIN
HORIZONTAL SEARCH ANGLE α AND NUMBER OF
PARTIAL SEARCH RANGES N CORRESPONDING TO
SET EFFECTIVE SEARCH RANGE] — S202
   ↓
[SET HORIZONTAL SEARCH ANGLE α AND
NUMBER OF PARTIAL SEARCH RANGES N] — S203
   ↓
END
```

FIG. 18B
S104

```
START
   ↓
[PERFORM ZOOM CONTROL SO THAT IMAGE
PICKUP LENS IS SET AT WIDE-ANGLE END] — S301
   ↓
END
```

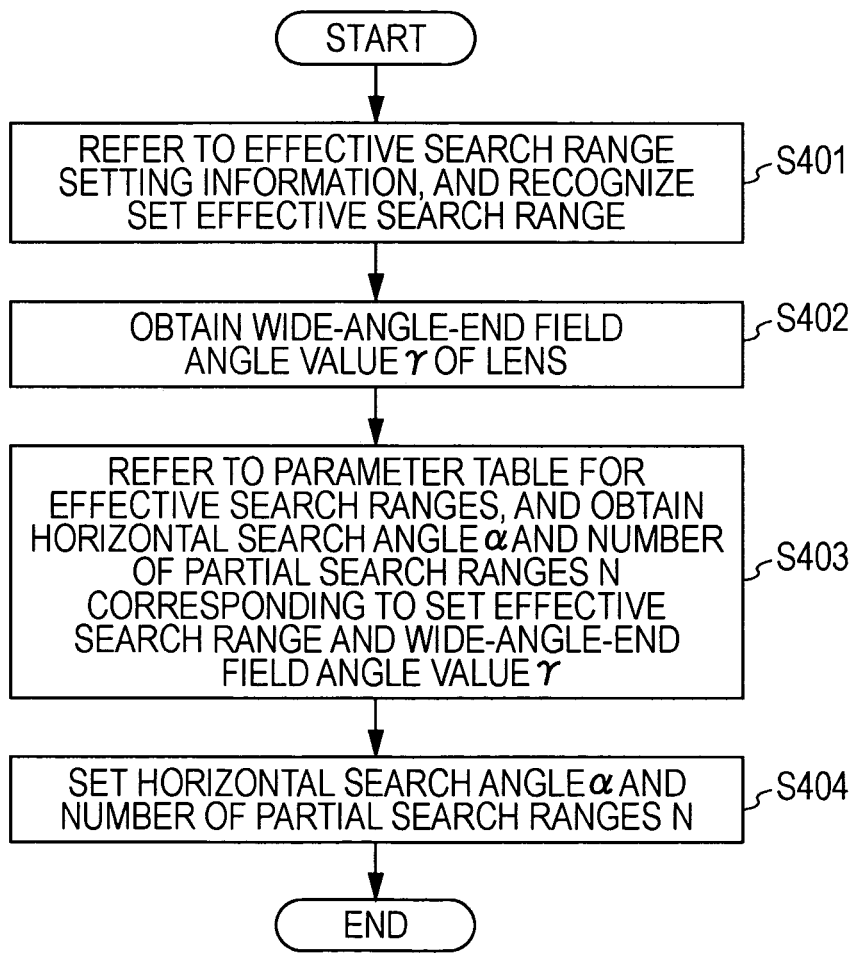

FIG. 20

| EFFECTIVE SEARCH RANGE | HORIZONTAL SEARCH ANGLE ($\alpha$) | NUMBER OF PARTIAL SEARCH RANGES (N) |
|---|---|---|
| UNLIMITED | 90° | 4 |
| 180° | 60° | 3 |
| 90° | 90° | 1 |

FIG. 21

| WIDE-ANGLE-END FIELD ANGLE VALUE ($\gamma$) | EFFECTIVE SEARCH RANGE | HORIZONTAL SEARCH ANGLE ($\alpha$) | NUMBER OF PARTIAL SEARCH RANGES (N) |
|---|---|---|---|
| 25 mm OR MORE | UNLIMITED | 90° | 4 |
| | 180° | 60° | 3 |
| | 90° | 90° | 1 |
| LESS THAN 25 mm | UNLIMITED | 120° | 3 |
| | 180° | 90° | 2 |
| | 90° | 90° | 1 |

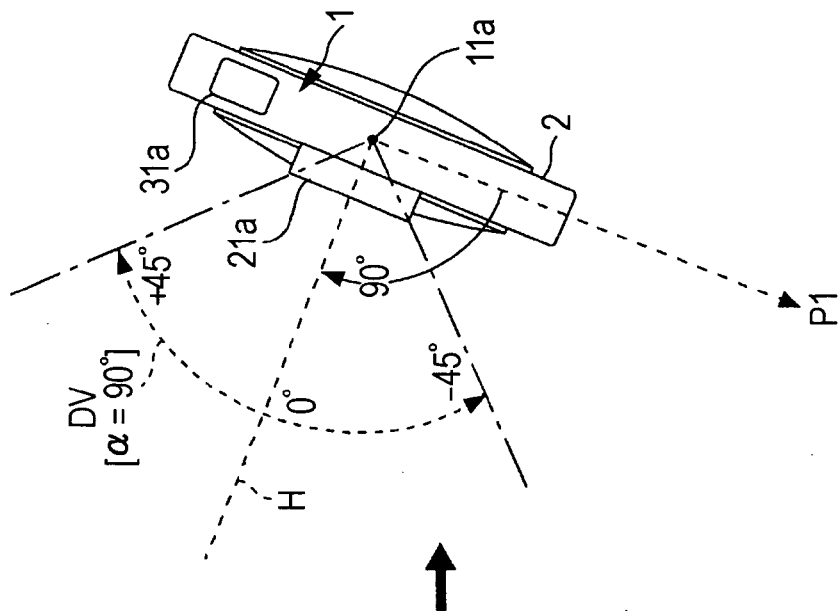
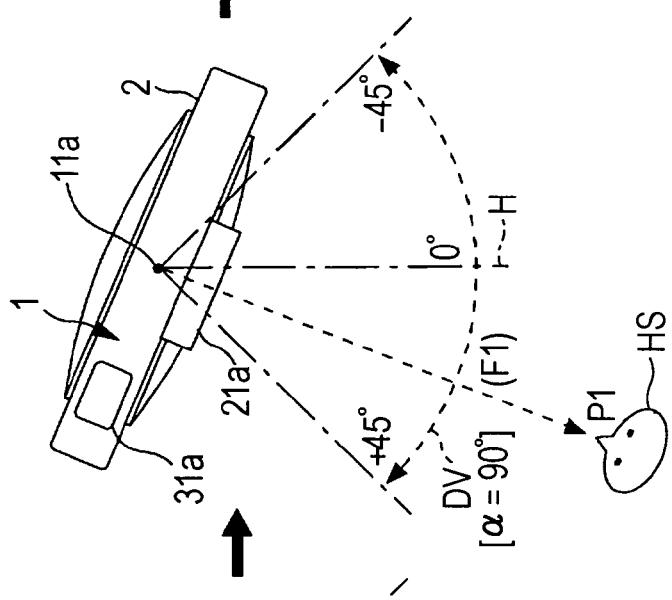
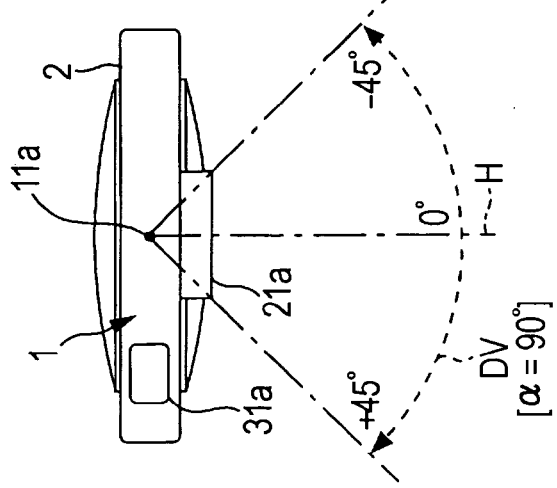

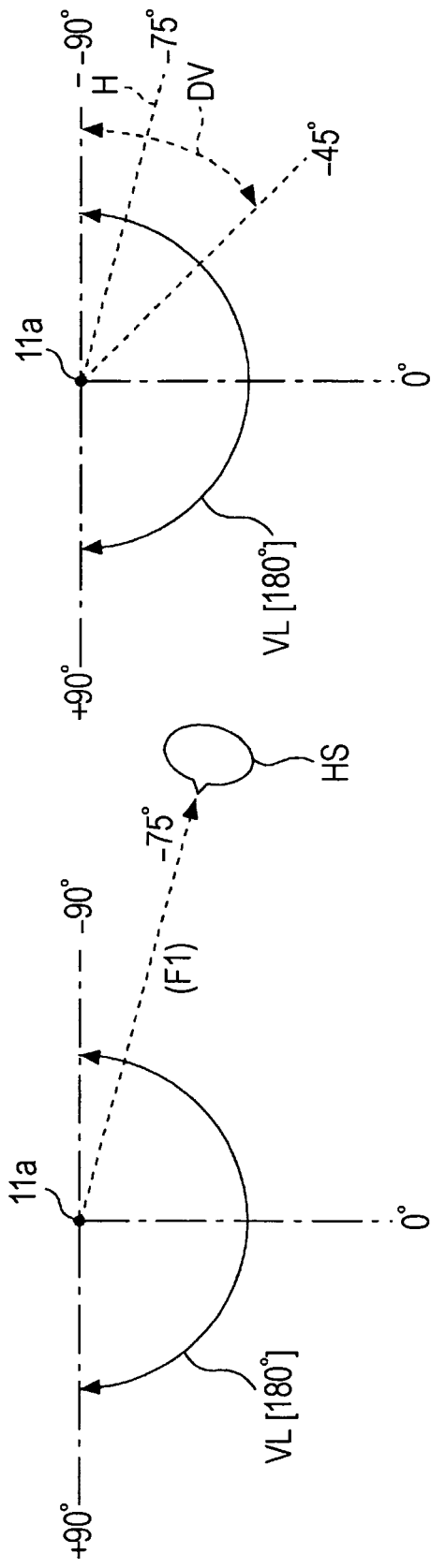

MOVABLE-MECHANICAL-SECTION CONTROLLING DEVICE, METHOD OF CONTROLLING MOVABLE MECHANICAL SECTION, AND PROGRAM

CROSS-REFERENCE TO RELATED APPLICATION

The present application claims priority from Japanese Patent Application No. JP 2009-149873 filed in the Japanese Patent Office on Jun. 24, 2009, the entire content of which is incorporated herein by reference.

BACKGROUND OF THE INVENTION

1. Field of the Invention

The present invention relates to a movable-mechanical-section controlling device that drives and controls a movable mechanical section, such as a pan head, on which an image pickup device is placed, for, for example, object search; and to a method of controlling the movable mechanical section. The present invention also relates to a program that is executed by the movable-mechanical-section controlling device.

2. Description of the Related Art

Japanese Unexamined Patent Application Publication No. 2001-268425 discusses, as an automatic tracking mechanism, a structure of a remote control pan head system that accommodates a television camera. That is, the document discusses a system configuration or a device that can automatically perform an object search operation by a combination of an image pickup device section and a pan head.

SUMMARY OF THE INVENTION

It is desirable to make it possible to perform a search operation as efficiently as possible when an image pickup device or an image pickup system that is formed so as to be capable of changing an image pickup direction of an image pickup section is caused to automatically detect or search for an object.

According to an embodiment of the present invention, there is provided a movable-mechanical-section controlling device including pan/tilt driving controlling unit means for performing driving control on a movable mechanical section having a structure that moves so that an image pickup direction of an image pickup section that obtains an image-pickup image by performing an image pickup operation changes in a pan direction and a tilt direction. In the controlling device, unit pan operations that are performed in an angular range in the pan direction are performed for the respective two or more different tilt positions with decreasing angle of elevation at the tilt positions.

In the above-described structure, search operations that are performed at the tilt positions within the angular range in the pan direction are performed for the respective tilt positions that differ from each other in the order in which the image pickup direction is set from an upwardly oriented state to a downwardly oriented state. That is, the search operations in the horizontal direction are performed by a predetermined number of times from the upper side to a lower side.

For example, when such search operations are performed, if it is assumed that there is a high probability that an object exists at a position where the image pickup direction is oriented upward, the probability with which the object is quickly fitted in an image pickup viewing angle range is high.

Accordingly, the present invention makes it possible to search for an object more efficiently than before, such as the time until an object is found being capable of being reduced.

BRIEF DESCRIPTION OF THE DRAWINGS

FIG. 17 is a flowchart showing a first exemplary algorithm for automatic image pickup recording including the object search operation according to the embodiment;

FIGS. 18A and 18B are flowcharts of an exemplary processing procedure for a parameter setting operation and a search angle-of-field setting controlling operation in the first exemplary algorithm;

FIG. 19 is a flowchart of an exemplary processing procedure as a modification of the parameter setting operation in the first exemplary algorithm;

FIG. 20 shows an exemplary content of a parameter table for ranges corresponding to effective search ranges corresponding to the first exemplary algorithm;

FIG. 21 shows an exemplary content of a parameter table for ranges corresponding to effective search ranges corresponding to the modification of the first exemplary algorithm;

FIGS. 23A to 23C illustrate another exemplary basic operation in the second exemplary partial search range setting operation;

FIGS. 24A and 24B illustrate an exemplary operation when the effective search range is limited in the second exemplary partial search range setting operation.

DESCRIPTION OF THE PREFERRED EMBODIMENTS

Figure 1A:
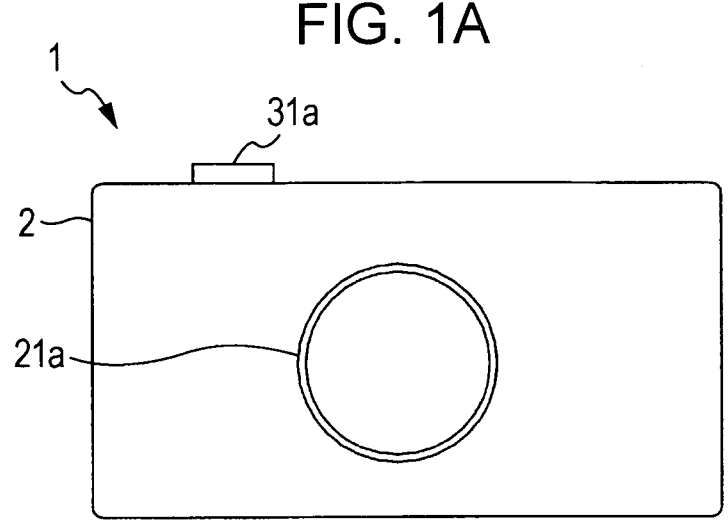
FIGS. 1A and 1B are, respectively, a simple external front view and a simple external back view of a digital still camera, which is an image pickup device of an image pickup system according to an embodiment of the present invention.

Embodiments for carrying out the invention of the application will hereunder be described in accordance with the following items in the following order:
<1. Configuration of Image Pickup System>
  [1-1. Overall Configuration]
  [1-2. Digital Still Camera]
  [1-3. Pan Head]
  [1-4. Exemplary Functional Structure of Image Pickup System]
<2. First Exemplary Object Search Movement>
<3. Second Exemplary Object Search Movement: Two-Dimensional Search Pattern In Embodiment>
  [3-1. First Example]
  [3-2. Second Example]
<4. Third Exemplary Object Search Movement: First Exemplary Partial Search Range Setting Operation In Embodiment>
  [4-1. When Rotation Angle Is Not Limited]
  [4-2. When Rotation Angle Is Limited: Effective Rotation Angle=180 Degrees]
  [4-3. When Rotation Angle Is Limited: Effective Rotation Angle=90 Degrees]
<5. Algorithm According to Embodiment>
  [5-1. Basic Example]
    [5-1-1. Modification of Parameter Setting]
<6. Fourth Exemplary Object Search Movement: Second Exemplary Partial Search Range Setting Operation>

In the description below, the terms "picture frame," "angle of field," "image pickup viewing angle," and "framing," will be used.

The term "picture frame" refers to an area range corresponding to one screen where, for example, an image can be seen as fitted therein. In general, the picture frame has the shape of an outer frame, which is a vertically long rectangular shape or a horizontally long rectangular shape.

The term "angle of field" is also called "zoom angle," and expresses by an angle a range in which an image is fitted in a picture frame determined by the position of a zoom lens in an optical system of an image pickup device. In general, the angle of field is determined by the focal length of the image pickup optical system and the size of an image surface (image sensor or film). However, here, the angle of field refers to a factor that can change in accordance with the focal length. The value of the angle of field may hereunder be represented by the focal length (such as a converted value of 35 mm).

The image pickup viewing angle is determined by an angle (angle of elevation, angle of depression) in a tilt (vertical) direction and a rotation angle in a pan (horizontal) direction in addition to the angle of field for the range in which an image, obtained by picking it up by the image pickup device placed in position, is fitted in the picture frame.

The term "framing" refers to a disposing state based on, for example, setting of the size of an object in the picture frame determined by the image pickup viewing angle.

In the embodiment, a structure based on the invention of the application is exemplified as being applied to an image pickup system including a digital still camera and a pan head to which the digital still camera is mounted.

1. Configuration of Image Pickup System 1-1. Overall Configuration

An image pickup system according to the embodiment includes a digital still camera 1 and a pan head 10 on which the digital still camera 1 is placed.

Figure 1B:
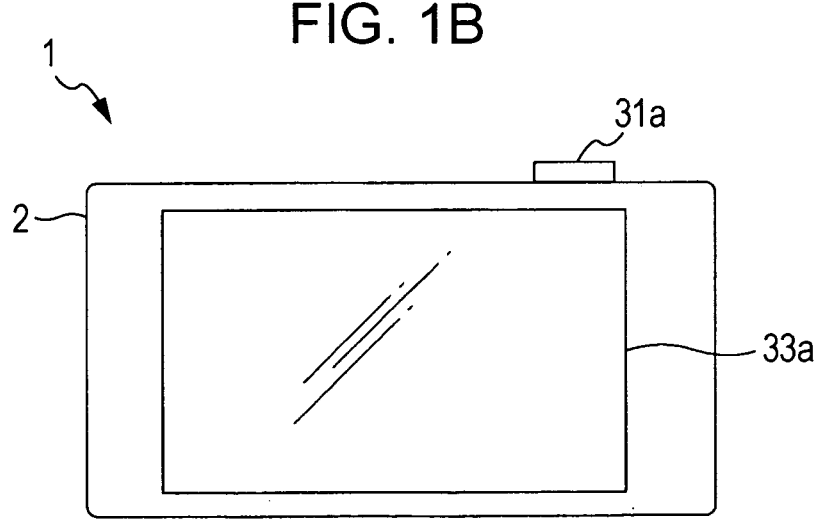

First, an exemplary external appearance of the digital still camera 1 is shown in FIGS. 1A and 1B. FIGS. 1A and 1B are, respectively, a front view and a back view of the digital still camera 1.

First, as shown in FIG. 1A, the illustrated digital still camera 1 includes a lens section 21a at the front side of a body 2. The lens section 21a is exposed at the outer side of the body 2 as an optical system for performing an image pickup operation.

A release button 31a is provided at the top surface of the body 2. In an image pickup mode, an image (image pickup image) picked up by the lens section 21a is generated as an image signal. If, in the image pickup mode, the release button 31a is operated, the image pickup image that is obtained at a timing of this operation is recorded on a storage medium as still image data. That is, a photograph is taken.

As shown in FIG. 1B, the digital still camera 1 has a display screen section 33a at the back surface thereof.

In the image pickup mode, the display screen section 33a displays an image called, for example, a through image and picked up by the lens section 21a at this time. In a reproduction mode, the display screen section 33a reproduces and displays image data recorded on the storage medium. Further, the display screen section 33a displays an operation image for a graphical user interface (GUI) in accordance with an operation performed by a user on the digital still camera 1.

The digital still camera 1 according to the embodiment is a combination of a touch panel with the display screen section 33a. This allows the user to perform an appropriate operation when the user touches the display screen section 33a with his/her finger.

The image pickup system (image pickup device) according to the embodiment is one including an image pickup device section, serving as the digital still camera 1, and a movable mechanical section, serving as the pan head 10 described below. However, even if the user only uses the digital still camera 1, the user can take photographs as with an ordinary digital still camera.

Figure 2:
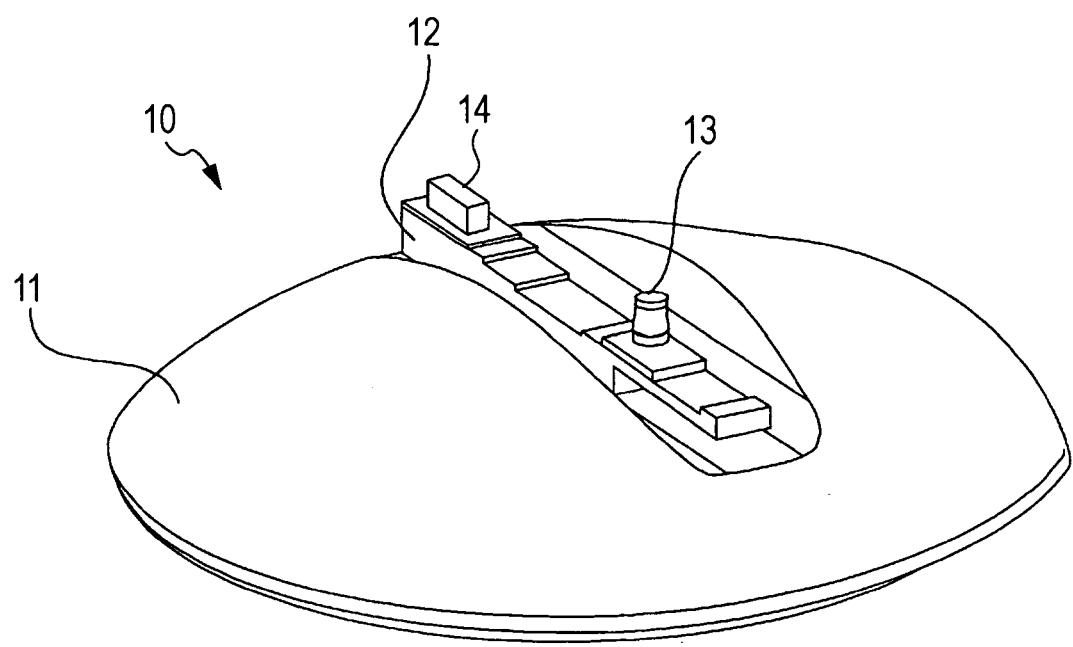
FIG. 2 is an exemplary external perspective view of a pan head of the image pickup system according to the embodiment.
Figure 3:
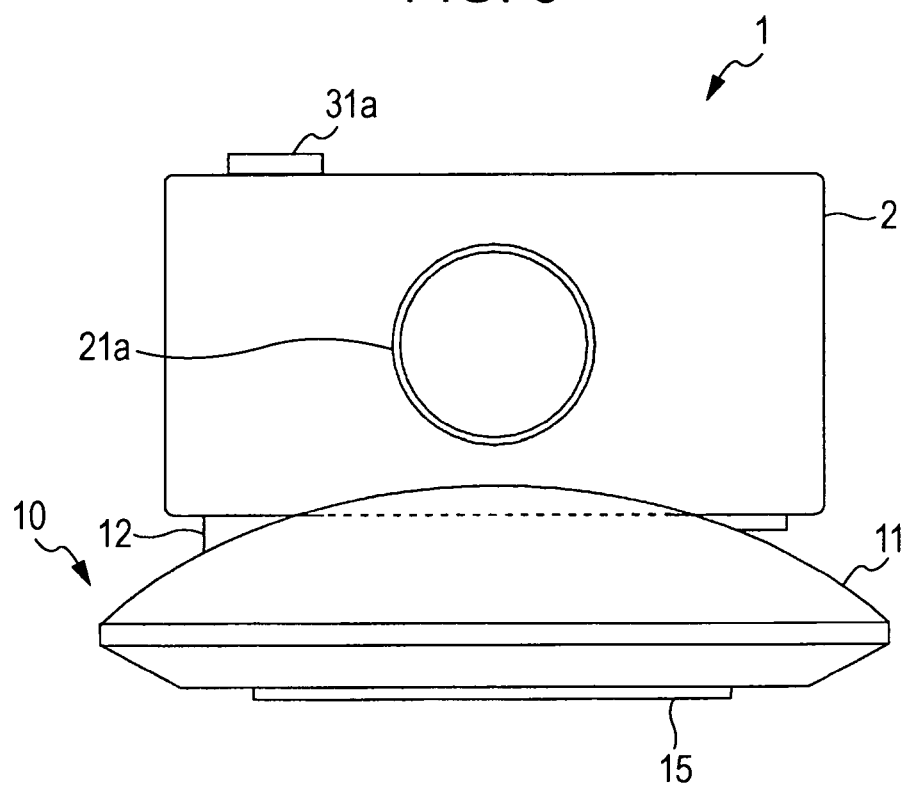
FIG. 3 is a front view of an example in which the digital still camera is mounted to the pan head in the image pickup system according to the embodiment.
Figure 4:
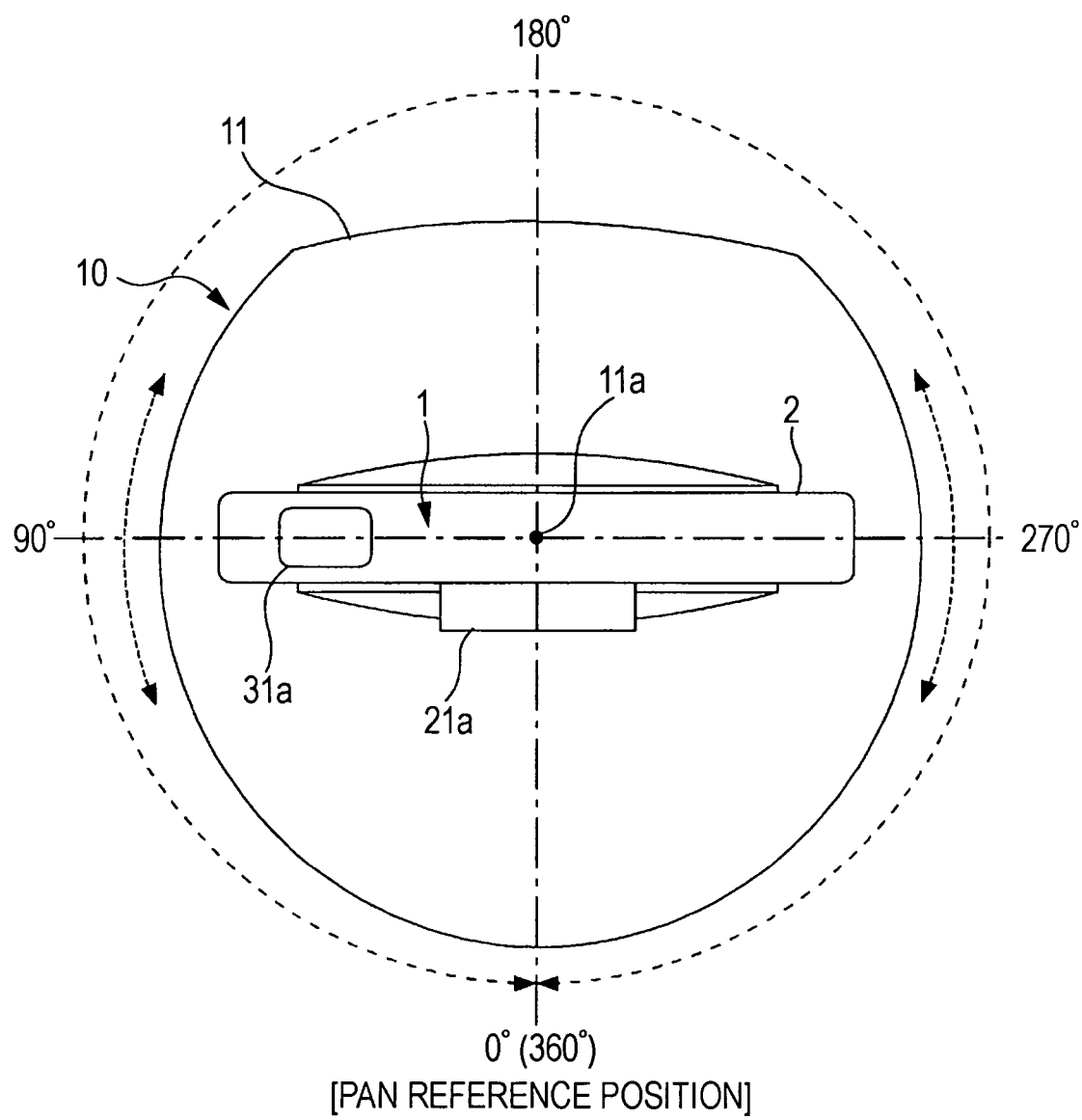
FIG. 4 is a plan view of the example in which the digital still camera is mounted to the pan head in the image pickup system according to the embodiment, and exemplary movements in a pan direction.
Figure 5:
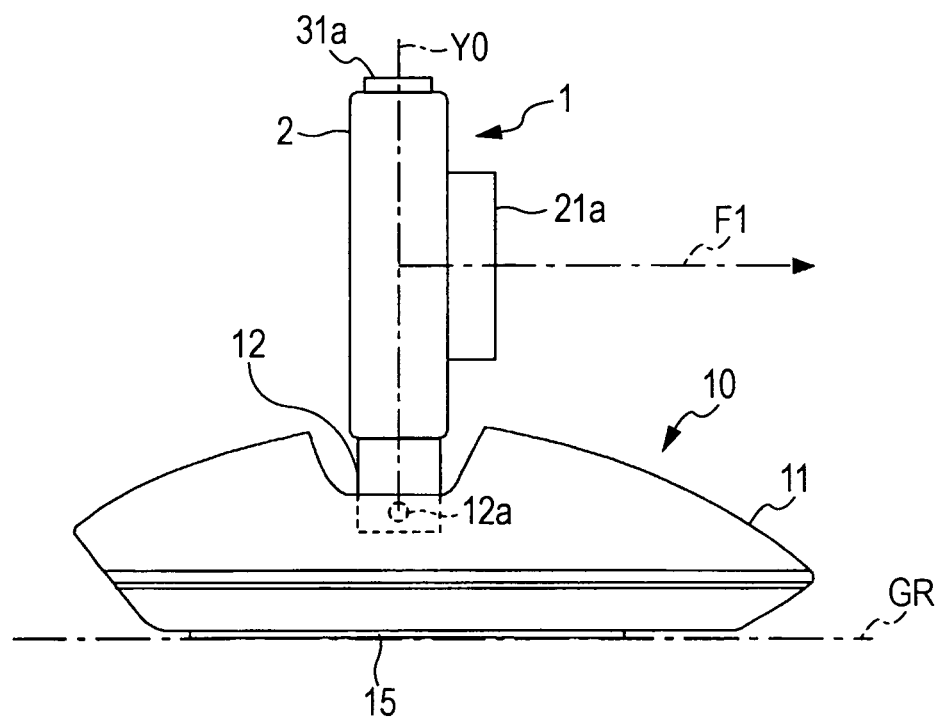
FIG. 5 is a side view of the example in which the digital still camera is mounted to the pan head in the image pickup system according to the embodiment.
Figure 6:
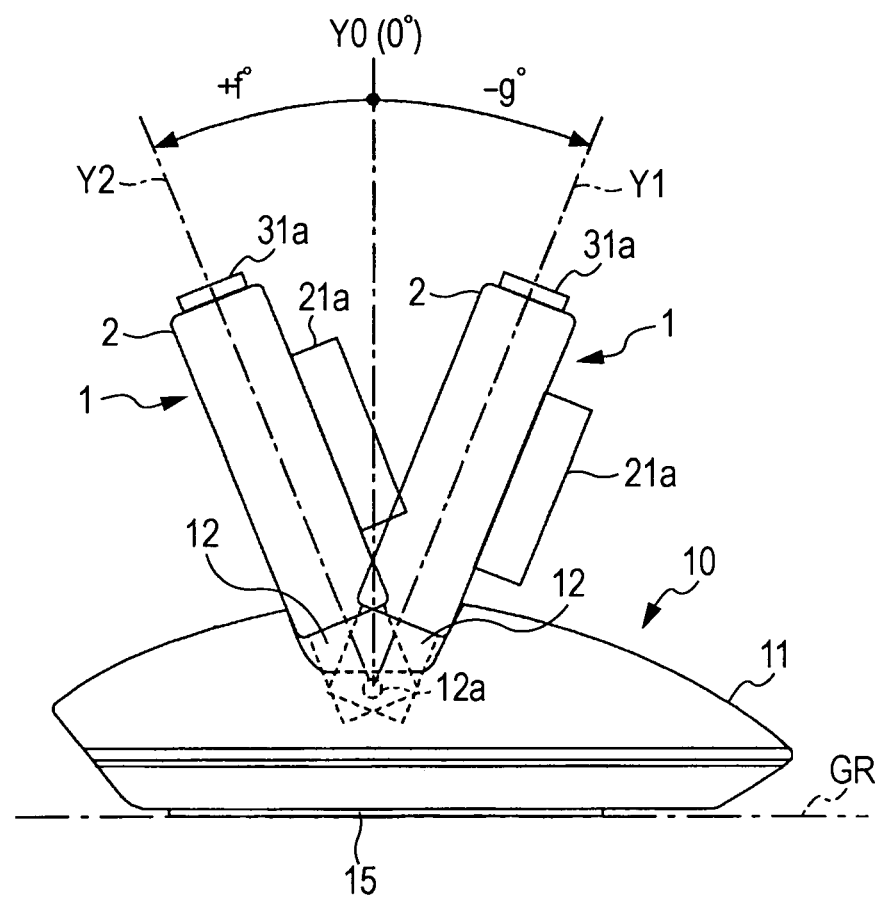
FIG. 6 is a side view of the example in which the digital still camera is mounted to the pan head, and exemplary movements in a tilt direction.

FIG. 2 is an external perspective view of the pan head 10. FIGS. 3 to 6 are each an external view of the image pickup system according to the embodiment in which the digital still camera 1 is properly placed on the pan head 10. FIG. 3 is a front view thereof; FIG. 4 is a plan view thereof; FIG. 5 is a side view thereof; and FIG. 6 is a side view showing a movable range of a tilt mechanism.

As shown in FIGS. 2, 3, 4, and 5, the pan head 10 generally has a structure in which a body section 11 is assembled on a ground table section 15, and a camera base section 12 is mounted to the base section 11.

When one tries to place the digital still camera 1 on the pan head 10, the bottom surface of the digital still camera 1 is placed on the top surface of the camera base section 12.

As shown in FIG. 2, here, a projection 13 and a connector 14 are provided on the top surface of the camera base section 12.

Although not shown, the lower surface of the body 2 of the digital still camera 1 has a hole that engages the projection 13. When the digital still camera 1 is properly placed on the camera base section 12, the hole and the projection 13 are engaged with each other. In this state, if an ordinary panning/tilting of the pan head 10 occurs, the digital still camera 1 is prevented from being displaced or removed from the pan head 10.

A connector is also provided at a predetermined position of the lower surface of the digital still camera 1. When the digital still camera 1 is properly placed on the camera base section 12 as described above, the connector of the digital still camera 1 and the connector 14 of the pan head 10 are connected to each other, so that at least communication therebetween is possible.

For example, the connector 14 and the projection 13 can actually move at the camera base section 12. Here, by using, for example, an adapter having a shape corresponding to the shape of the bottom surface of the digital still camera 1, a different type of digital still camera in a state that can perform communication with the pan head 10 can be placed on the camera base section 12.

Communication between the digital still camera 1 and the camera base section 12 may be performed by radio.

While the digital still camera 1 is placed on the pan head 10, a structure in which the digital still camera 1 is charged from the pan head 10 may be used. In addition, a structure in which an image signal (of, for example, an image that is reproduced at the digital still camera 1) is also transmitted towards the pan head 10, and is output to an external monitor device from the pan head 10 by, for example, a cable or radio communication may be provided. That is, the pan head 10 may be used not only for changing the image pickup viewing angle of the digital still camera 1, but also as a cradle.

The image pickup viewing angle is determined by an angle (angle of elevation, angle of depression) in a tilt (vertical) direction and a rotation angle in a pan (horizontal) direction in addition to the angle of field for the range in which an image, obtained by picking it up by the image pickup device placed in position, is fitted in the picture frame.

Next, basic movements in a pan direction and a tilt direction of the digital still camera 1 caused by the pan head 10 will be described.

First, the basic movement in the pan direction is as follows.

While the pan head 10 is placed on, for example, a floor surface, the bottom surface of the ground table section 13 is grounded. In this state, as shown in FIG. 4, the body section 11 can rotate clockwise or counterclockwise around a rotating shaft 11a as a rotation center. By this, the image pickup viewing angle of the digital still camera 1 placed on the pan head 10 changes along a left-right direction (horizontal direction). That is, a panning movement is applied.

In addition, a pan mechanism of the pan head 10 in this case has a structure that allows it to rotate freely without restriction both clockwise and counterclockwise by 360 degrees or more.

Further, in the pan mechanism of the pan head, a reference position in the pan direction is determined.

Here, as shown in FIG. 4, with the pan reference position being 0 degrees (360 degrees), a rotation position of the body section 11 along the pan direction, that is, a pan position is indicated from 0 degrees to 360 degrees.

Next, the basic movement of the pan head 10 in the tilt direction is as follows.

The movement in the tilt direction is obtained by moving the camera base section 12 around a rotating shaft 12a as a rotation center in both an angle-of-elevation direction and an angle-of-depression direction as shown in FIGS. 5 and 6.

Here, FIG. 5 shows a state in which the camera base section 12 is at a tilt reference position Y0 (0 degrees). In this state, an image pickup direction F1, which coincides with an image pickup optical axis of the lens section 21a (optical system section), and a ground surface section GR, to which the ground table section 13 is grounded, are parallel to each other.

Here, as shown in FIG. 6, first, in the angle-of-elevation direction, the camera base section 12 can move around the rotating shaft 12a as the rotation center in a range of from the tilt reference position Y0 (0 degrees) to a predetermined maximum rotation angle of +f degrees. Even in the angle-of-depression direction, the camera base section 12 can move around the rotating shaft 12a as the rotation center in a range of from the tilt reference position Y0 (0 degrees) to a predetermined maximum rotation angle of −g degrees. Accordingly, by moving the camera base section 12 in a range of from the maximum rotation angle of +f degrees to the maximum rotation angle of −g degrees with the tilt reference position Y0 (0 degrees) as a reference point, the image pickup viewing angle of the digital still camera 1 placed on the pan head 10 (camera base section 12) changes along an up-down direction (vertical direction). That is, a tilting movement is performed.

The external structures of the pan head 10 shown in FIGS. 2 to 6 are only examples. As long as the digital still camera 1 placed on the pan head 10 can move in the pan direction and the tilt direction, any other physical structure or configuration may be used.

1-2. Digital Still Camera

Figure 7:
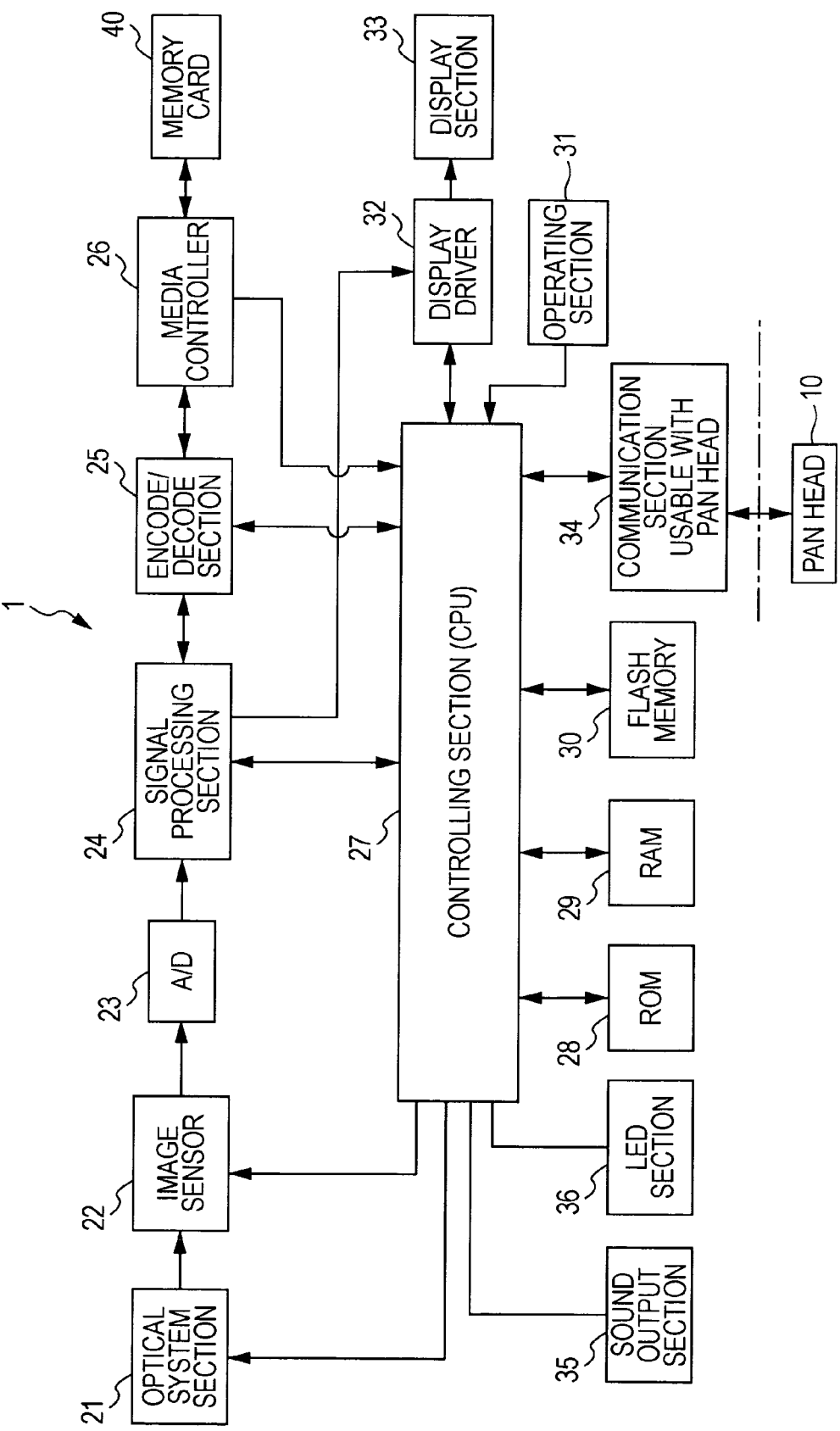
FIG. 7 is a block diagram of an exemplary configuration of the digital still camera.

The block diagram of FIG. 7 shows an actual exemplary internal structure of the digital camera 1.

In FIG. 7, first, an optical system section 21 includes, for example, a stop and a predetermined number of image pickup lens groups (including, for example, a zoom lens and a focus lens). Light that is incident upon the optical system section 21 is focused as image pickup light upon a light-receiving surface of an image sensor 22.

The optical system section 21 also includes a driving mechanical section for driving, for example, the zoom lens, the focus lens, and the stop. The operation of the driving mechanical section thereof is controlled by what is called camera control operations, such as an automatic exposure control operation, an automatic focusing control operation, and a zoom (angle of field) control operation, which are executed by a controlling section 27.

The image sensor 22 performs what is called photoelectric conversion in which the image pickup light obtained by the optical system section 21 is converted into an electrical signal. Therefore, the image sensor 22 receives at a light-receiving surface of a photoelectric conversion element the image pickup light from the optical system section 21, and successively outputs at a predetermined timing signal charges accumulated in accordance with the intensity of the received light. By this, electrical signals (image pickup signals) corresponding to the image pickup light are output. Although the photoelectric conversion element (image pickup element) used as the image sensor 22 is not particularly limited, for example, a complementary metal oxide semiconductor (CMOS) sensor or charge coupled device (CCD) may actually be used. If a CMOS sensor is used, as a device (part) corresponding to the image sensor 22, an analog-to-digital converter corresponding to an A/D converter 23 (described below) may also be included.

The image pickup signal output from the image sensor 22 is input to the A/D converter 23, is converted into a digital signal, and is input to a signal processing section 24.

The signal processing section 24 takes in the digital image pickup signal, output from the A/D converter 23, by, for example, a unit corresponding to one still image (frame image). By performing a predetermined signal processing operation on the image pickup signal of a still image unit taken in by the signal processing section 24, the signal processing section 24 generates image-pickup image data (image-pickup still image data), which is image signal data corresponding to one still image.

If the image-pickup image data generated by the signal processing section 24 as described above is recorded as image information on a memory card 40 (which is a storage medium (storage medium device)), for example, the image-pickup image data corresponding to one still image is output to an encode/decode section 25 from the signal processing section 24.

The encode/decode section 25 performs a compression encoding operation by a predetermined still image compression encoding method on the image-pickup image data of a still image unit output from the signal processing section 24. Here, for example, in accordance with a control operation by the controlling section 27, a header or the like is added so that the encode/decode section 25 converts the image-pickup image data into image data compressed to a predetermined form. The image data generated in this way is transferred to a media controller 26. In accordance with the control operation of the controlling section 27, the media controller 26 causes the image data that is being transferred to be written to and recorded on the memory card 40. The memory card 40 here is a storage medium having, for example, the external shape of a card in accordance with a predetermined standard, and includes a nonvolatile semiconductor storage element, such as a flash memory, therein. The storage medium on which the image data is recorded may be other types of storage media other than the aforementioned memory card.

The signal processing section 24 according to the embodiment is formed so as to use the image-pickup image data obtained as described above, and so as to execute an image processing operation as an object detection operation as described below.

The digital still camera 1 executes an image display operation by a display section 33 using the image-pickup image data obtained by the signal processing section 24, so that what is called a through image (which is an image that is currently being picked up) can be displayed. For example, the signal processing section 24 takes in the image pickup signal output from the A/D converter 23 as previously described, and generates the image-pickup image data corresponding to one still image. By continuing this operation, pieces of image-pickup image data each corresponding to a frame image in a moving image are successively generated. The pieces of image-pickup image data that are successively generated in this way are transferred to a display driver 32 in accordance with a control operation of the controlling section 27. By this, a through image display is performed.

The display driver 32 generates a driving signal for driving the display section 33 on the basis of the image-pickup image data that is input from the signal processing section 24 as described above, and outputs the driving signal to the display section 33. By this, the display section 33 successively displays images based on the pieces of image-pickup image data of a still image unit. If the user views the successive display of the images, the images that are picked up at this time are dynamically displayed on the display section 33. That is, through images are displayed.

The digital still camera 1 can reproduce any piece of image data recorded on the memory card 40, and display the image on the display section 33.

Therefore, the controlling section 27 specifies image data, and instructs the media controller 26 to read out the data from the memory card 40. In response to this instruction, the media controller 26 accesses an address on the memory card 40 on which the specified image data is recorded, reads out the data, and transfers the read out data to the encode/decode section 25.

In accordance with, for example, a control operation of the controlling section 27, the encode/decode section 25 takes out subject data as compressed still image data from the image-pickup image data transferred from the media controller 26, so that image-pickup data corresponding to one still image is obtained. Then, the image-pickup image data is transferred to the display driver 32. By this, the display section 33 reproduces and displays an image of the image-pickup image data recorded on the memory card 40.

The display section 33 can display a user interface image (operation image) in addition to, for example, the through image and a reproduction image of image data. In this case, in accordance with, for example, an operation state at this time, the controlling section 27 generates display image data serving as user interface data, and outputs the display image data to the display driver 32. This causes the display section 33 to display the user interface image. For example, as on a particular menu screen, the user interface image can be displayed on a display screen of the display section 33 independently of the reproduction image of image-pickup image data and a monitor image. In addition, the user interface image may be displayed so that it is superposed upon or combined with a portion of the monitor image or the reproduction image of the image-pickup image data.

The controlling section 27 actually includes, for example, a central processing unit (CPU), and constitutes a microcomputer along with, for example, ROM 28 and RAM 29. ROM 28 stores, for example, various pieces of setting information related to the operations of the digital still camera 1, in addition to, for example, programs to be executed by the CPU as the controlling section 27. RAM 29 is a primary storage device for the CPU.

A flash memory 30 in this case is provided as a nonvolatile storage area used for storing, for example, the various pieces of setting information that are changed (re-written) in accordance with, for example, a user operation or operation history. If ROM 28 uses, for example, a nonvolatile memory such as a flash memory, a portion of a storage area of ROM 28 may be used in place of the flash memory 30.

An operating section 31 is shown as various operating elements provided in the digital still camera 1, and as an operation information signal output member that generates operation information signals (that are in accordance with operations of these operating elements) and outputs them to the CPU. The controlling section 27 executes predetermined processing operations in accordance with the operation information signals input from the operating section 31. By this, the operations of the digital still camera 1 are executed in accordance with the operations of the user.

A communication section 34 usable with the pan head is a member that performs communication in accordance with a predetermined communication method between the pan head 10 and the digital still camera 1. For example, when the digital still camera 1 is mounted to the pan head 10, the communication section 34 includes, for example, a physical layer structure and a structure for realizing communication in correspondence with a predetermined layer above the physical layer structure. The physical layer structure is provided for making it possible to exchange communication signals through wire or by radio between the digital still camera 1 and a communication section at the pan head 10. When considered in correspondence with FIG. 2, as the physical layer structure, a connector section that is connected to the connector 14 is included.

1-3. Pan Head

Figure 8:
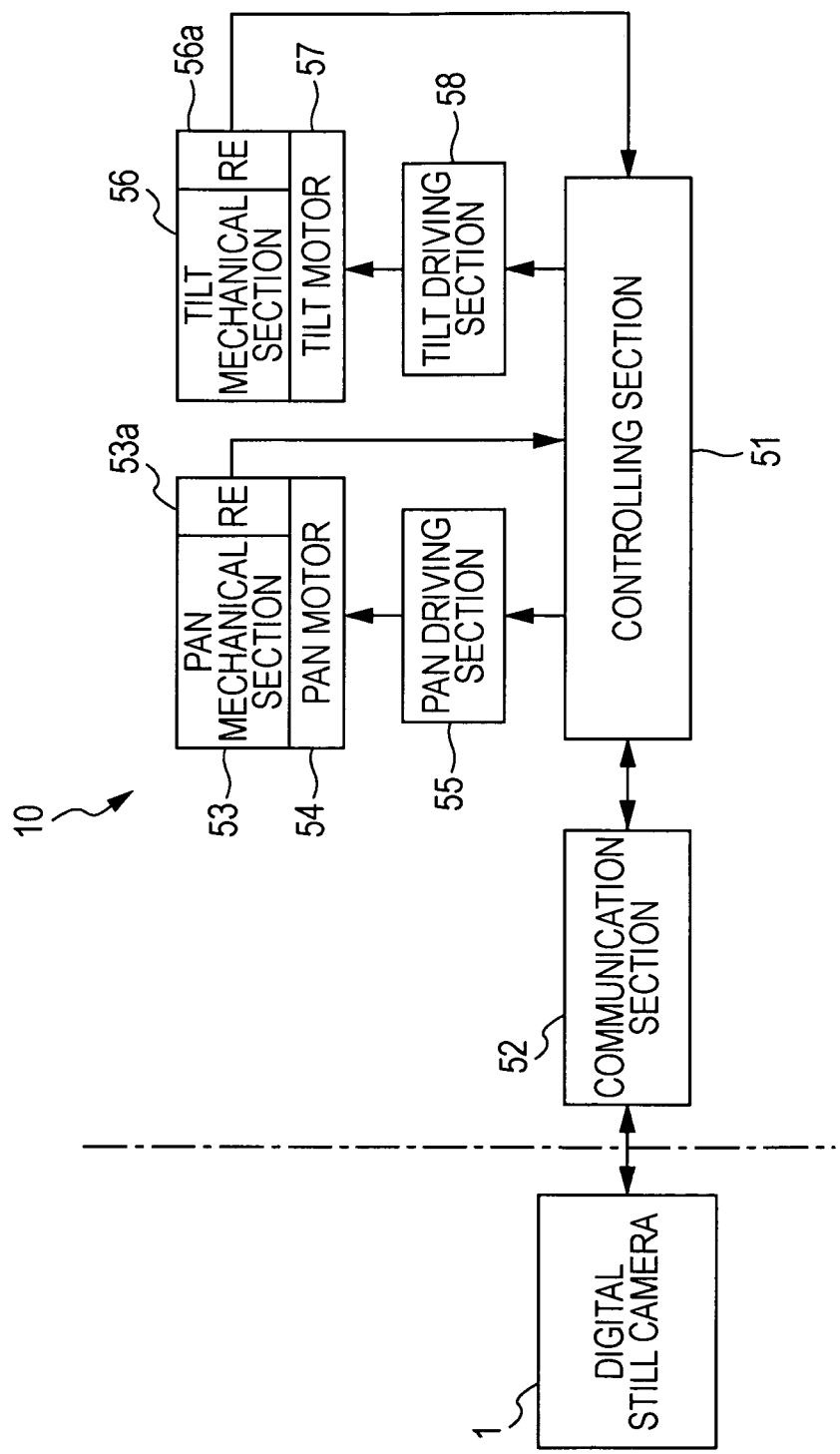
FIG. 8 is a block diagram of an exemplary structure of the pan head.

The block diagram of FIG. 8 shows an exemplary internal structure of the pan head 10.

As mentioned above, the pan head 10 includes a pan/tilt mechanism. As members corresponding thereto, a pan mechanical section 53, a pan motor 54, a tilt mechanical section 56, and a tilt motor 57 are included.

The pan mechanical section 53 includes a mechanism for applying movement in the pan direction (horizontal direction or left-right direction) shown in FIG. 4 to the digital still camera 1 mounted to the pan head 10. The movement of this mechanism is obtained by rotation of the pan motor 54 in a forward direction and a reverse direction. Similarly, the tilt mechanical section 56 includes a mechanism for applying movement in the tilt direction (vertical direction or up-down direction) shown in FIG. 6 to the digital camera 1 mounted to the pan head 10. The movement of this mechanism is obtained by rotation of the tilt motor 57 in a forward direction and a reverse direction.

A controlling section 51 includes a microcomputer formed by assembling, for example, a CPU, ROM, and RAM to each other; and controls the movements of the pan mechanical section 53 and the tilt mechanical section 56. When, for example, the controlling section 51 controls the movement of the pan mechanical section 53, the controlling section 51 outputs a signal specifying the direction in which the pan mechanical section 53 is to be moved and the movement speed thereof to the pan driving section 55. The pan driving section 55 generates a motor driving signal corresponding to the input signal and outputs the generated motor driving signal to the pan motor 54. For example, if the motor is a stepping motor, the motor driving signal is a pulse signal corresponding to PWM control.

The motor driving signal causes the pan motor 54 to rotate, for example, in a predetermined rotation direction and at a predetermined rotation speed. As a result, the pan mechanical section 53 is also driven so as to move in a movement direction and at a movement speed corresponding to those of the pan motor 54.

Similarly, when the movement of the tilt mechanical section 56 is to be controlled, the controlling section 51 outputs a signal specifying a movement direction and a movement speed for the tilt mechanical section 56 to the tilt driving section 58. The tilt driving section 58 generates a motor driving signal corresponding to the input signal and outputs the generated motor driving signal to the tilt motor 57. The motor driving signal causes the tilt motor 57 to rotate, for example, in a predetermined rotation direction and at a predetermined rotation speed. As a result, the tilt mechanical section 56 is also driven so as to move in a movement direction and at a movement speed corresponding to those of the tilt motor 57.

The pan mechanical section 53 includes a rotary encoder (rotation detector) 53*a*. The rotary encoder 53*a* outputs to the controlling section 51*a* detection signal indicating a rotation angle amount of the pan mechanical section 53 in accordance with the rotation of the pan mechanical section 53. Similarly, the tilt mechanical section 56 includes a rotary encoder 56*a*. The rotary encoder 56*a* also outputs to the controlling section 51*a* signal indicating a rotation angle amount of the tilt mechanical section 56 in accordance with the rotation of the tilt mechanical section 56.

A communication section 52 is a member that performs communication in accordance with a predetermined communication method between it and the communication section 34 usable with the pan head and disposed in the digital still camera 1 mounted to the pan head 10. Similarly, the communication section 52 includes a physical layer structure and a structure for realizing the communication in correspondence with a predetermined layer above the physical layer structure. The physical layer structure is provided for making it possible to exchange communication signals through wire or by radio with the communication section 34 of the digital still camera 1. In FIG. 2, as the physical layer structure, the connector 14 of the camera base section 12 is included.

1-4. Exemplary Functional Structure of Image Pickup System

Figure 9:
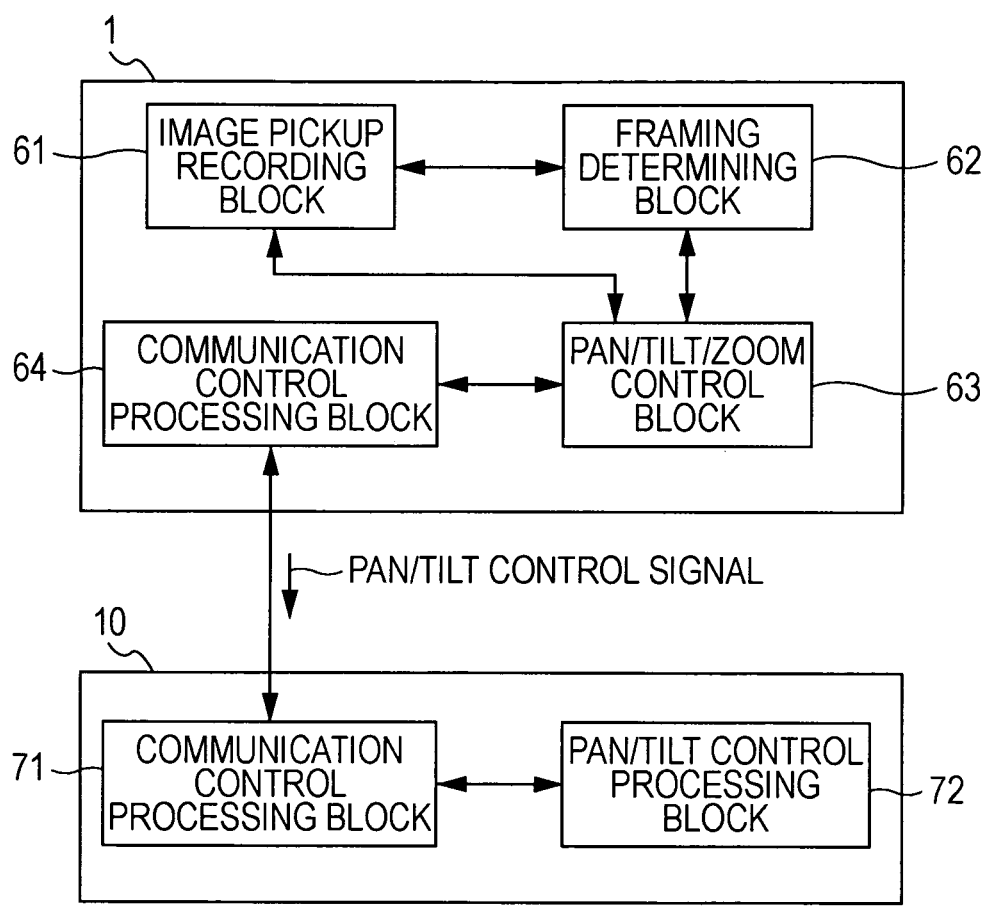
FIG. 9 is a block diagram of an exemplary configuration of an internal system for the image pickup system according to the embodiment.

Next, the block diagram of FIG. 9 shows a functional structure (system configuration) realized by hardware and software (program) for the pan head 10 and the digital still camera 1 of the image pickup system according to the embodiment.

In FIG. 9, the digital still camera 1 includes an image pickup recording block 61, a framing determining block 62, a pan/tilt/zoom control block 63, and a communication control processing block 64.

The image pickup recording block 61 is a member that obtains an image obtained by an image pickup operation as image signal data (image-pickup image data), and executes a control operation for storing the image-pickup image data on the storage medium. This member includes, for example, an optical system for an image pickup operation, an image pickup element (image sensor), a signal processing circuit that generates the image-pickup image data from a signal output from the image pickup element, and a recording control/processing system for writing the image-pickup data to and recording (storing) it on the storage medium.

The recording (image pickup recording) of the image-pickup image data in the image pickup recording block 61 in this case is executed by an instruction and a control operation of the framing determining block 62.

The framing determining block 62 takes in the image-pickup image data output from the image pickup recording block 61 for input thereto. On the basis of the image-pickup image data, the framing determining block 62 first detects an object, and finally executes an operation for determining framing. Then, a framing matching control operation for obtaining image-pickup image data indicating the content of an image obtained by the determined framing is also executed.

Here, an object detecting operation (including setting of an initial face frame) executed by the framing determining block 62 can be executed by the signal processing section 24 in FIG. 7. The object detection operation by the signal processing section 24 can be executed as an image signal processing operation by a digital signal processor (DSP). That is, it can be executed by a program or an instruction provided to the DSP.

Correction of a face frame, determination of a framing, and controlling of framing matching, executed by the framing determining block 62, can be executed as operations that the CPU serving as the controlling section 27 executes in accordance with a program.

The pan/tilt/zoom control block 63 performs a pan/tilt/zoom control operation so that an image-pickup viewing angle and a framing corresponding to an optimal framing that has been determined are obtained in accordance with an instruction of the framing determining block 62. That is, for controlling the frame matching, for example, the image-pickup viewing angle and the framing to be obtained in accordance with the optimal framing that has been determined are specified to the pan/tilt/zoom control block 63. For orienting the digital still camera 1 in an image pickup direction in which the specified framing and image pickup viewing angle are obtained, the pan/tilt/zoom control block 63 determines a movement amount of the pan/tilt mechanism of the pan head 10, and generates a pan/tilt control signal that specifies movement corresponding to the determined movement amount.

A zoom mechanism included in the image pickup recording block 61 is controlled so that, for example, a zoom position for obtaining a suitable angle of field that has been determined is provided, and the zoom mechanism is set at this zoom position.

The communication control processing block 64 is a member for executing communication between it and a communication control processing block 71 of the pan head 10 in accordance with a predetermined communication protocol. A pan/tilt control signal generated by the pan/tilt/zoom control block 63 is transmitted to the communication control processing block 71 of the pan head 10 by the communication of the communication control processing block 64.

For example, as shown in FIG. 9, the pan head 10 includes the communication control processing block 71 and a pan/tilt control processing block 72.

The communication control processing block 71 is a member for performing communication between it and the communication control processing block 64 of the digital still camera 1. When the communication control processing block 71 receives the pan/tilt control signal, it outputs the pan/tilt control signal to the pan/tilt control processing block 72.

The pan/tilt control processing block 72 executes a pan/tilt control operation among the control operations executed by, for example, the microcomputer (not shown here) of the pan head 10.

In accordance with the input pan/tilt control signal, the pan/tilt control processing block 72 controls a pan driving mechanical section and a tilt driving mechanism (neither of which are not shown). By this, panning and tilting are performed for obtaining a horizontal viewing angle and a vertical viewing angle in accordance with the optimal framing.

The framing determining block 62 here executes the object detection operation as described below. The pan/tilt/zoom control block 63 can perform a pan/tilt/zoom control operation for searching for the object in accordance with an instruction.

2. First Exemplary Object Search Movement

As mentioned above, the image pickup system according to the embodiment including the digital still camera 1 and the pan head 10 automatically searches for an object by a pan/tilt/zoom movement, and detects, for example, surrounding objects such as human beings. If an object is detected, a framing setting operation is automatically performed for a detected object, to perform an image-pickup recording operation.

In such an automatic image-pickup recording operation, it is considered what search movement is to be performed when the object search operation is executed, that is, what movement pattern in an image pickup direction (image-pickup optical axis) resulting from panning/tilting is to be provided.

Figure 10:
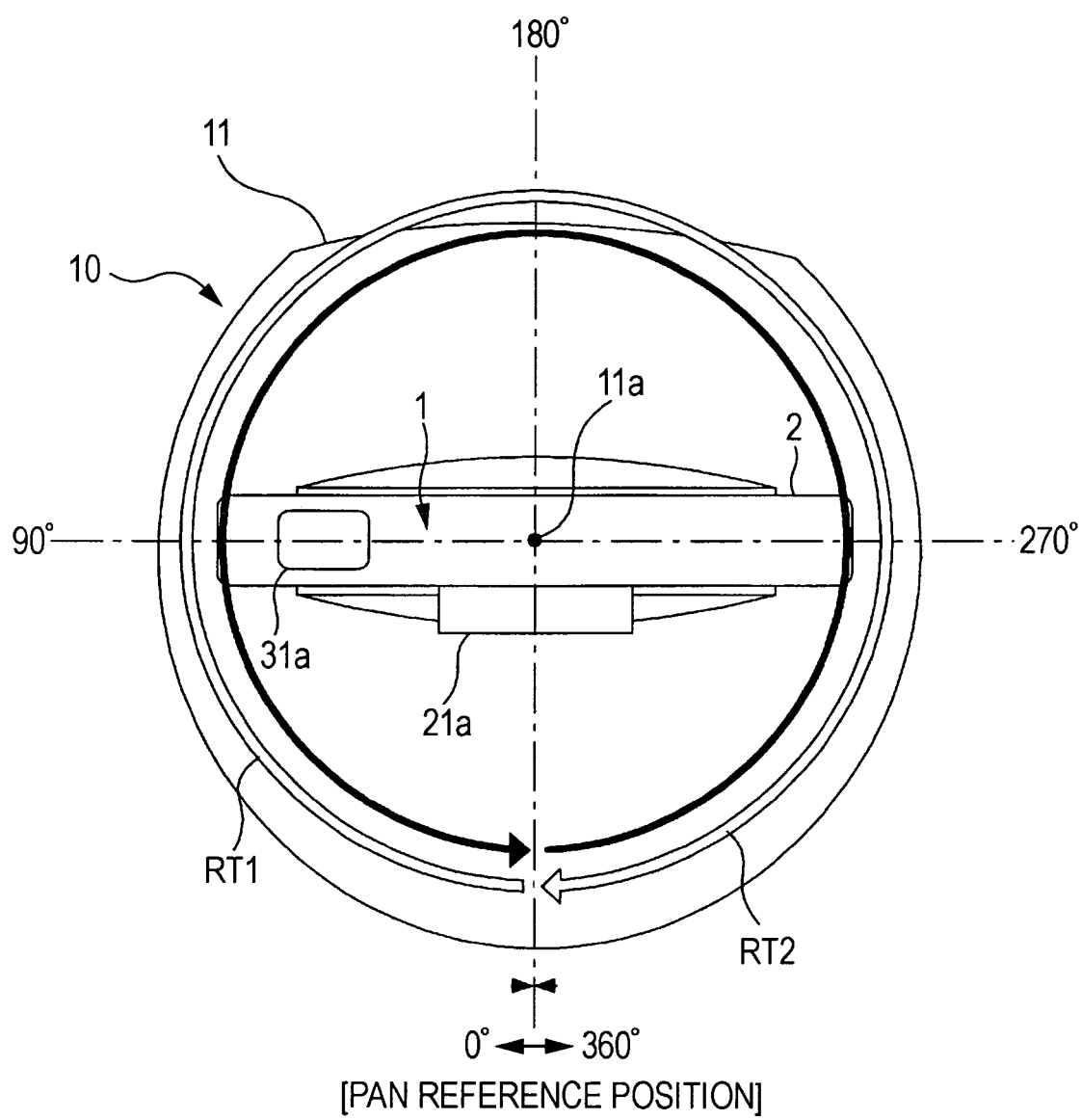
FIG. 10 illustrates the movements in the pan direction as object search movements that can be considered.
Figure 11:
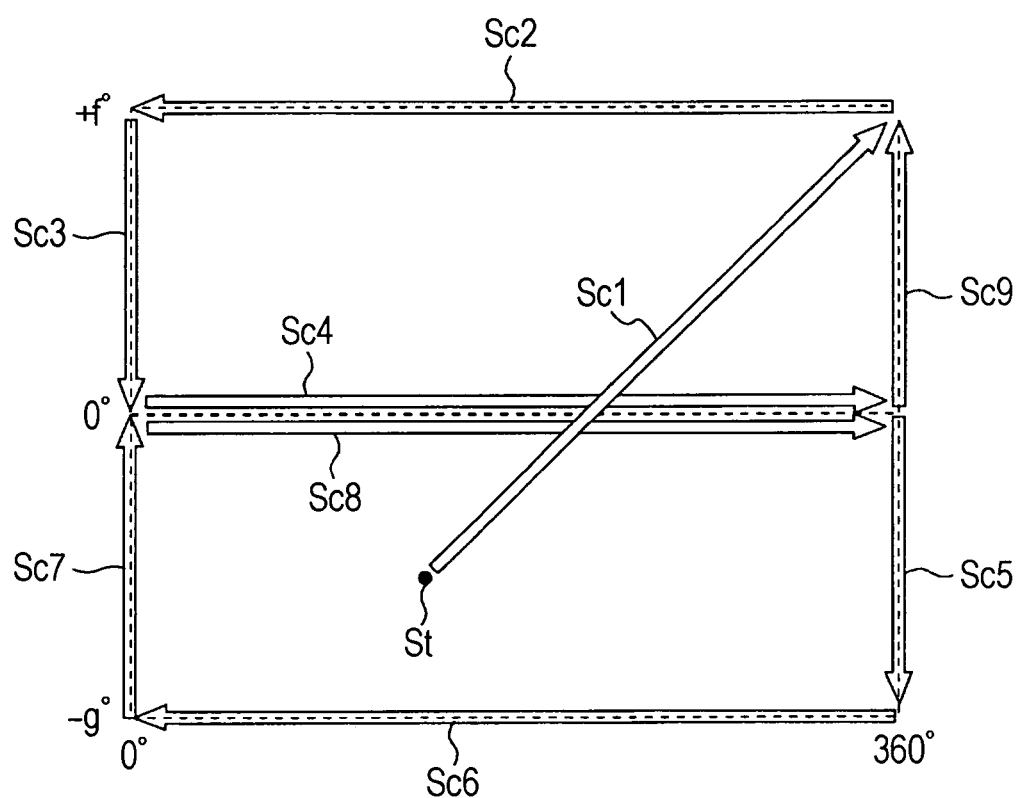
FIG. 11 illustrates a two-dimensional search pattern as the object search movements that can be considered.

FIGS. 10 and 11 each show an example of movement that can be considered when an object search operation is carried out.

The movement in the pan direction is as shown in FIG. 10. As indicated by a first search rotation direction RT1, the pan head 10 is rotated by 360 degrees in the clockwise direction. Next, as indicated by a second search rotation direction RT2, the pan head 10 is rotated by 360 degrees in the counterclockwise direction. In this example, the movement in the pan direction is a combination of the movement in the first search rotation direction RT1 and the movement in the second search rotation direction RT2.

Here, by combining movements in the tilt direction, the object search is performed in accordance with a two-dimensional search pattern in which the pan head 10 is moved as indicated by white arrows Sc1 to Sc9 in that order shown in FIG. 11.

First, here, the search for the object is started in a state in which the pan head 10 is positioned at a starting point St corresponding to a certain pan/tilt position. Then, as indicated by the arrow Sc1, the pan head 10 moves from the starting point St to a pan position of 360 degrees (0 degrees)/a tilt position of +f degrees, to perform panning/tilting. This pan position of 360 degrees (0 degrees)/tilt position of +f degrees becomes an origin (search origin P) of the object search operation. As can be understood from FIGS. 4 and 6, at the pan position of 360 degrees (0 degrees)/tilt position of +f degrees, the image pickup direction F1 is oriented towards a pan standard position in the pan direction and is oriented upward by an angle of elevation of +f degrees in the tilt direction.

Next, the pan head 10 moves as indicated by the arrow Sc2. That is, with the tilt position of +f degrees being maintained, for example, the pan head 10 moves to a pan position of 0 degrees by moving in the second search rotation direction RT2. That is, the pan head 10 rotates by 360 degrees in the counterclockwise direction, and returns to the same pan position of 360 degrees (0 degrees).

Next, as indicated by the arrow Sc3, at a pan position of 0 degrees (360 degrees), tilting is performed so that the pan head 10 is moved from the tilt position of +f degrees to a tilt position of 0 degrees. By this, the image pickup direction F1 becomes horizontal to the pan reference position.

Next, with the pan head 10 being at the tilt position of 0 degrees, panning is performed by 360 degrees in the first search direction RT1 as shown by the arrow Sc4.

Next, as indicated by the arrow Sc5, tilting is performed so that the pan head 10 is moved from the tilt position of 0 degrees to a tilt position of −g degrees.

Next, as indicated by the arrow Sc6, with the pan head 10 being at the tilt position of −g degrees, panning is performed by 360 degrees in the second search rotation direction.

Next, as indicated by the arrow Sc7, with the pan head 10 being at the pan position of 0 degrees (360 degrees), tilting is performed so that the pan head 10 is moved from the tilt position of −g degrees to the tilt position of 0 degrees.

Next, as indicated by the arrow Sc8, with the tilt position of 0 degrees being maintained, panning in which the pan head 10 is rotated by 360 degrees in the first search rotation direction RT1 is performed.

Next, as indicated by the arrow Sc9, with the pan position of 360 degrees (0 degrees) being maintained, tilting is performed so that the pan head 10 is moved from the tilt position of 0 degrees to the tilt position of +f degrees.

When the tilting in accordance with the arrow Sc9 ends, the pan head 10 has moved completely once in accordance with the search pattern. As can be understood from FIG. 11, when the pan head 10 has moved completely once in accordance with the arrows Sc2 to Sc9, the search has covered 360 degrees at the upper side (the tilt position of +f degrees), the center (the tilt position of 0 degrees), and the lower side (the tilt position of −g degrees), and in the vertical directions (+f degrees to −g degrees) at a front side (pan reference position) in the pan direction.

Subsequently, similarly, the panning and the tilting movements corresponding to the arrows Sc2 to Sc9 are successively executed and repeated. If, in this process, an object is detected, the digital still camera 1 performs a framing matching control operation and executes an image-pickup recording operation. If, for example, the detected object is picked up and recorded for providing the necessary number of photographs using a proper framing, the pan head 10 returns to the pan position of 360 degrees (0 degrees)/tilt position of +f degrees, which is the search origin P, to repeat the object search operation in accordance with the pattern including the movements indicated by the arrows Sc2 to Sc9.

3. Second Exemplary Object Search Movement:
Two-Dimensional Search Pattern in Embodiment 3-1. First Example In this example, the search patterns illustrated in FIGS. 10 and 11 is improved, to propose a search pattern that can be used to perform an object search operation more efficiently. A first example thereof is illustrated with reference to FIG. 12.

First, in the search pattern in the example, a horizontal search angle α is set. As illustrated below, the horizontal search angle α can be changed in accordance with, for example, a pattern of movement in the pan direction. A most basic horizontal search angle α is 360 degrees.

Figure 12:
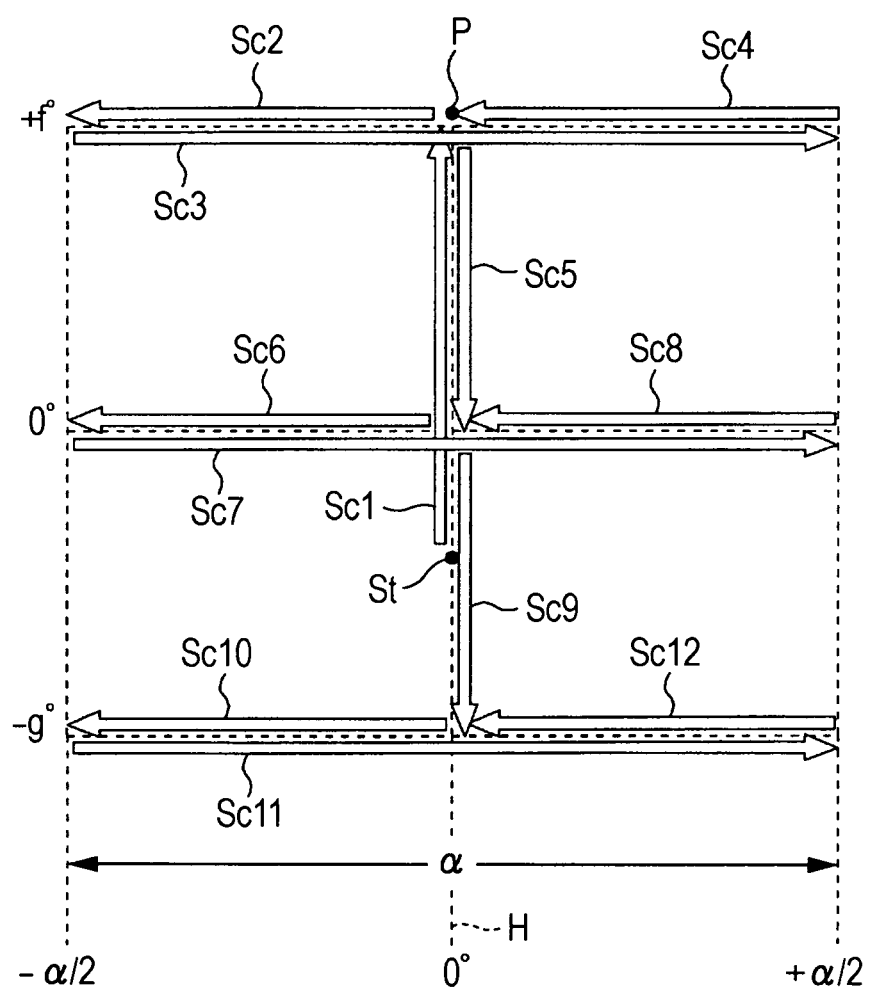
FIG. 12 shows a first exemplary two-dimensional search pattern according to the embodiment.

In the search pattern shown in FIG. 12, the center position in the horizontal search angle α is handled as a horizontal center position H. This horizontal center position H is 0 degrees, and a movable range in the pan direction is represented as being from +α/2 degrees to 0 degrees to −α/2 degrees.

The search pattern shown in FIG. 12 is as follows. In a detailed description of the search pattern here, the horizontal search angle α is set at 360 degrees.

Here, when the pan head 10 is at a certain pan position and a certain tilt position corresponding to a starting point St, searching of an object is started. Then, as indicated by a white arrow Sc1, the pan head 10 moves only in a tilt direction from the starting point St to a tilt position of +f degrees, with the pan position being maintained. The tilt position of +f degrees at the pan position situated in correspondence with the starting position St is a search origin P in this case.

In FIG. 11, an absolute position, that is, the pan position of 360 degrees (0 degrees)/tilt position of +f degrees is defined as the search starting point P. In contrast, in FIG. 12, the tilt position of +f degrees at the pan position situated in correspondence with the starting position St is the search origin P. That is, the pan position at the search starting point in the embodiment changes in accordance with the position of the starting point St.

When, in FIG. 12, the pan head 10 reaches the search origin P, as indicated by a white arrow Sc2, panning in which the pan head 10 is moved from the horizontal center position H (0 degrees) to −2α degrees is performed with the tilt position of +f degrees being maintained. Next, as indicated by a white arrow Sc3, panning in which the pan head 10 is moved from the pan position of −2α degrees to the pan position of +2α degrees (which is the other limit) is performed with the tilt position of +f degrees being maintained. Next, panning in which the pan head 10 is moved from the pan position of +2α degrees to the horizontal center position H (0 degrees) is performed with the tilt position of +f degrees being maintained.

When the horizontal search angle α is 360 degrees, the movements indicated by the arrows Sc2 to Sc4 are such that, for example, while the digital still camera 1 is fixed to the tilt position of +f degrees, first, the pan head 10 is rotated counterclockwise (in the second search rotation direction RT2) from the horizontal center position, is rotated clockwise by 360 degrees (in the first search rotation direction RT1), is rotated counterclockwise by 180 degrees, and returns to the horizontal center position H.

Here, when a search operation in the pan direction is performed while one prescribed tilt position is being fixed, by the movement indicated by the arrow Sc3, the pan head 10 moves one way by 360 degrees in the clockwise direction (the first search rotation direction RT1). By the movements indicated by the arrows Sc2 and Sc4, the pan head 10 similarly moves one way by 360 degrees in the counterclockwise direction (the second rotation direction RT2). Therefore, by the movements indicated by the arrows Sc2, Sc3, and Sc4, the pan head 10 moves completely once in a prescribed rotation angular range in the pan direction. For example, although searching may be carried out by a one-way movement, in the example shown in FIG. 12, searching may be carried out by two-way movements to more precisely detect an object.

By the movements indicated by the arrows Sc2 to Sc4, first, the searching in the pan direction while the pan head 10 is at the tilt position of +f degrees with the image pickup direction F1 being oriented upward is completed.

Next, as indicated by an arrow Sc5, tilting in which the pan head 10 is moved from the tilt position of +f degrees to the tilt position of 0 degrees is performed with the horizontal center position H (0 degrees) being maintained. This causes the image pickup direction F1 to be oriented towards the center (horizontally) in a vertical direction.

Here, as indicated by arrows Sc6, Sc7, and Sc8, panning of the pan head 10 is performed similarly to the panning performed by the movements indicated by the arrows Sc2, Sc3, and Sc4. By this, the searching in the pan direction by the one two-way movement while the image pickup direction F1 is oriented towards the center (horizontally) in the vertical direction is completed.

Next, as indicated by an arrow Sc9, tilting in which the pan head 10 is moved from the tilt position of 0 degrees to the tilt position of −g degrees is performed with the horizontal center position H (0 degrees) being maintained. This causes the image pickup direction F1 to be oriented downward.

Here, as indicated by arrows Sc10, Sc11, and Sc12, panning of the pan head 10 is performed similarly to the panning performed by the movements indicated by the arrows Sc2, Sc3, and Sc4. By this, the searching in the pan direction by the one two-way movement while the image pickup direction F1 is oriented downward is completed.

According to the description given thus far, in the search pattern shown in FIG. 12, first, the pan position obtained at the start of the object search is set as it is as a pan position at the search origin P.

This provides, for example, the following advantages. Here, the pan position of the pan head 10 on which the digital still camera 1 is placed is not a pan reference position. In addition, in this state, the pan head 10 is placed again to start an object search. In such a case, a user has a high tendency to place again the pan head 10 so that the image pickup direction F1 of the digital still camera 1 substantially faces the user even if the user is unconscious of it. Considering such a case, as in the embodiment, if the pan position of the pan head 10 at the start of the object search is set as the pan position at the search origin P, first, it is highly probable that the user, who has placed the pan head 10 again, is immediately subjected to a search operation. In contrast, in the case shown in FIG. 11, if the object search is started after returning the pan head 10 to the search origin P set as an absolute position, it is highly probable that it takes a long time for the user, who has the pan head 10 again, to be subjected to a search operation.

From what has been mentioned above, it is highly probable that human beings that become photographic subjects exist near the horizontal center position H situated in correspondence with the search origin P in at least the pan direction. Therefore, in the search pattern shown in FIG. 12, when panning is performed for changing the image pickup direction F1 in the vertical direction, it is performed at the horizontal center position H.

The invention of the application considered and examined several situations, and confirmed that, when the image pickup direction is oriented upward, it is highly probable that the face of a human being, who becomes a photographic subject, exists and is detected within a picture frame. As a general tendency, when the user tries to place the pan head 10 having the digital still camera 1 placed thereon for automatic photographic recording operations, the place where the pan head 10 is placed is often like a table surrounded by human beings who become photographic objects. If the human beings, who become photographic objects, are primarily standing, for example, a base having a height from the chest to the waist is more often used. That is, the faces of the human beings, who become photographic objects, tend to be positioned higher than the digital still camera 1.

Therefore, in the search pattern shown in FIG. 12, in a search operation in the pan direction, for example, with the image pickup direction being oriented upward, first, the search operation in the pan direction is performed (Sc2, Sc3, Sc4), then, the same search operation is performed at the center (in the horizontal direction) (Sc6, Sc7, Sc8), and at the lower side (Sc10, Sc11, Sc12) in that order. That is, each search operation in the pan direction with its corresponding tilt position being fixed is performed while changing tilt positions so that the image pickup direction F1 is gradually changed from the state in which it is oriented upward to the state in which it is oriented downward.

In this case, the search pattern shown in FIG. 12 is provided so that an object is efficiently detected as quickly as possible.

Here, the tilt position is fixed at three angles, that is, +f degrees, 0 degrees, and −g degrees. However, this is only one example. If it is fixed at two or more angles, the tilt position may be set at an arbitrary number of angles within the range of from +f degrees to −g degrees. It is not necessary for a plurality of tilt positions that are set to be separated at equal angles. The separation angles may be changed, so that, for example, the separation angle between the tilt positions where the image pickup direction F1 is upwardly oriented is less than the separation angle between the tilt positions where the image pickup direction F1 is downwardly oriented.

3-2. Second Example

Figure 13:
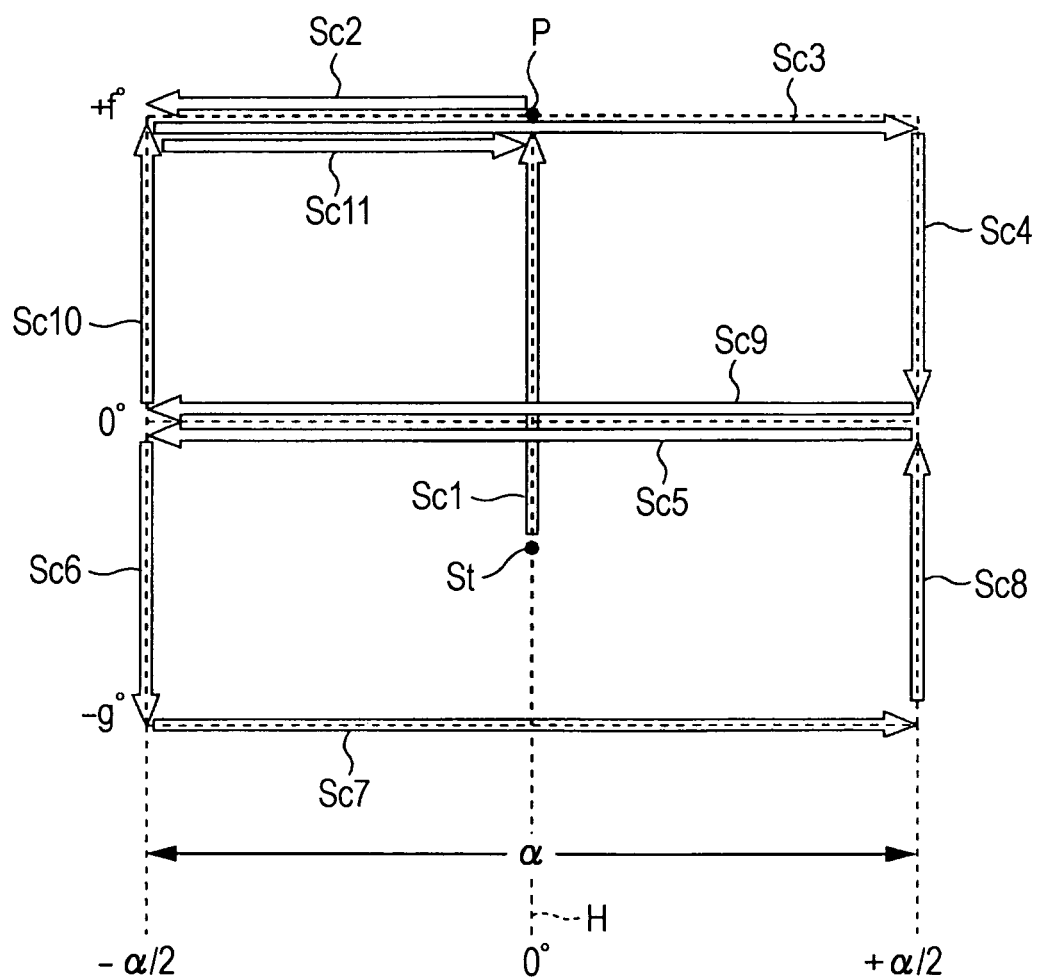
FIG. 13 shows a second exemplary two-dimensional search pattern according to the embodiment.

FIG. 13 shows a second exemplary two-dimensional search pattern according to the embodiment, which is a simplified pattern based on the two-dimensional search pattern shown in FIG. 12.

Even in FIG. 13, when a movement according to the object search pattern is started, as indicated by an arrow Sc1, tilting in which the pan head 10 at the horizontal center position H is moved to the tilt position of +f degrees is performed with a pan position corresponding to the starting position St being set at the horizontal center position H. This causes the image pickup direction F1 to be oriented upward.

Next, as indicated by an arrow Sc2, panning in which the pan head 10 is moved by 180 degrees to the pan position of −α/2 degrees is performed with the tilt position of +f degrees being maintained. Next, as indicated by an arrow Sc3, panning in which the pan head 10 is rotated by 360 degrees from the pan position of −α/2 degrees to the pan position of +α/2 degrees is performed. By this, the search in the left-right direction while the image pickup direction F1 is oriented upward is completed. The movements indicated by the arrows Sc2 and Sc3 do not result in a complete two-way movement. In the first example, the movements in the pan direction for the respective fixed tilt positions result in one two-way movement. However, in the second example, for simplicity, if a one-way search operation in at least either the clockwise direction or the counterclockwise direction is performed, the search operation in the pan direction at one fixed tilt position is considered as being completed.

Next, as indicated by an arrow Sc4, tilting in which the pan head 10 is moved from the tilt position of +f degrees to the tilt position of 0 zero degrees is performed with the pan position of +α/2 degrees being maintained. By this, the image pickup direction F1 is changed from the state in which it is oriented upward to the state in which it is oriented towards the center. Next, as indicated by an arrow Sc5, panning in which the pan head 10 is moved by 360 degrees from the pan position of +α/2 degrees to the pan position of −α/2 degrees is performed with the tilt position being 0 degrees. By this, a search operation in the pan direction with the image pickup direction F1 being oriented towards the center in the vertical direction is completed.

Next, as indicated by an arrow Sc6, at the pan position of −α/2 degrees, tilting in which the pan head 10 is moved from the tilt position of 0 degrees to the tilt position of −g degrees is performed, so that the image pickup direction F1 is oriented downward. Next, as indicated by an arrow Sc7, panning in which the pan head 10 is rotated by 360 degrees from the pan position of −α/2 degrees to the pan position of +α/2 degrees is performed with the tilt position of −g degrees being maintained. By this, a one-way search operation in the pan direction with the image pickup direction F1 being oriented downward is completed.

Next, as indicated by an arrow Sc8, at the pan position of +α/2 degrees, tilting in which the pan head 10 is moved from the tilt position of −g degrees to the tilt position of 0 degrees is performed. Further, as indicated by an arrow Sc9, at the tilt position of 0 degrees, panning in which the pan head 10 is rotated by 360 degrees from the pan position of +α/2 degrees to the pan position of −α/2 degrees is performed again.

Next, as indicated by an arrow Sc10, at the pan position of −α/2, tilting in which the pan head 10 is moved from the tilt position of 0 degrees to the tilt position of +f degrees is performed. Further, as indicated by an arrow Sc11, at the tilt position of +f degrees, panning in which the pan head 10 is moved from the pan position of −α/2 degrees to the horizontal center position H (0 degrees) is performed. By this, the pan head 10 has completely moved in accordance with the search pattern once, and the pan/tilt position returns to the search origin P.

Comparing FIG. 13 with FIG. 12, the amount of movement of the panning/tilting in accordance with the two-dimensional search pattern after the pan head 10 has moved completely once is less in FIG. 13 than in FIG. 12. By this, it is possible to reduce the time that the pan head 10 takes to move completely once in accordance with the search pattern in FIG. 13. Accordingly, it is possible to, for example, search for an object in a shorter time.

However, in the example shown in FIG. 13, for simplifying the search pattern, the orientation of the image pickup direction F1 in the vertical direction is changed not at the horizontal center position H but at the pan positions of ±α/2 degrees. However, in the embodiment, considering the probability of existence of an object, the image pickup direction F1 in the vertical direction is considered more important than the image pickup direction F1 in the horizontal direction. Therefore, even in FIG. 12, as in FIG. 13, a search operation in the left-right direction is performed at the upper side, the center, and the lower side in that order. In this way, in the second example, the time taken for the pan head 10 to move completely once in accordance with the search pattern is reduced and search performance is satisfactory in practical applications.

In the first and second examples of the search patterns in the embodiment, correspondences of +α/2 degrees and −α/2 degrees with the actual directions of movements in the pan direction may be reversed. That is, in the previous description of FIG. 12, the pan movement direction towards the left in the plane of the figure and indicated by, for example, the arrow Sc2 is a counterclockwise direction, and the pan movement direction towards the right in the plane of the figure and indicated by, for example, the arrow Sc3 is a clockwise direction. In contrast, the pan movement direction indicated by, for example, the arrow Sc2 may be a clockwise direction, and the pan movement direction indicated by, for example, the arrow Sc3 may be a counterclockwise direction

4. Third Exemplary Object Search Movement: First Exemplary Partial Search Range Setting Operation in Embodiment

4-1. When Rotation Angle is not Limited

In the description given thus far, when the pan head 10 is moved completely once in accordance with the search pattern in FIG. 12 or FIG. 13 in the embodiment, the maximum movement range in the pan direction, that is, the horizontal search angle α is 360 degrees.

In the embodiment, in order to perform an object search operation more efficiently, for example, a structure has been proposed in which the horizontal search angle α is divided by predetermined angles smaller than 360 degrees, and the search is performed in accordance with the search pattern shown in, for example, FIG. 12 or FIG. 13 for every divided angle of the horizontal search angle α (partial angular value).

In the object search in which the horizontal search angle α is divided, for example, the search pattern shown in FIG. 11 may also be used. However, when the search patterns according to the embodiment shown in FIGS. 12 and 13 are used, the object search operation can be performed more efficiently. In the description below, for convenience, it is assumed that the actual search pattern shown in FIG. 12 is applied for every divided angle of the horizontal search angle α.

First, as a most basic example of an object search operation in which the horizontal search angle α is divided, an example of a search operation in which a rotation angle in the pan direction of the pan head 10 is not limited will be described with reference to FIG. 14.

Figure 14:
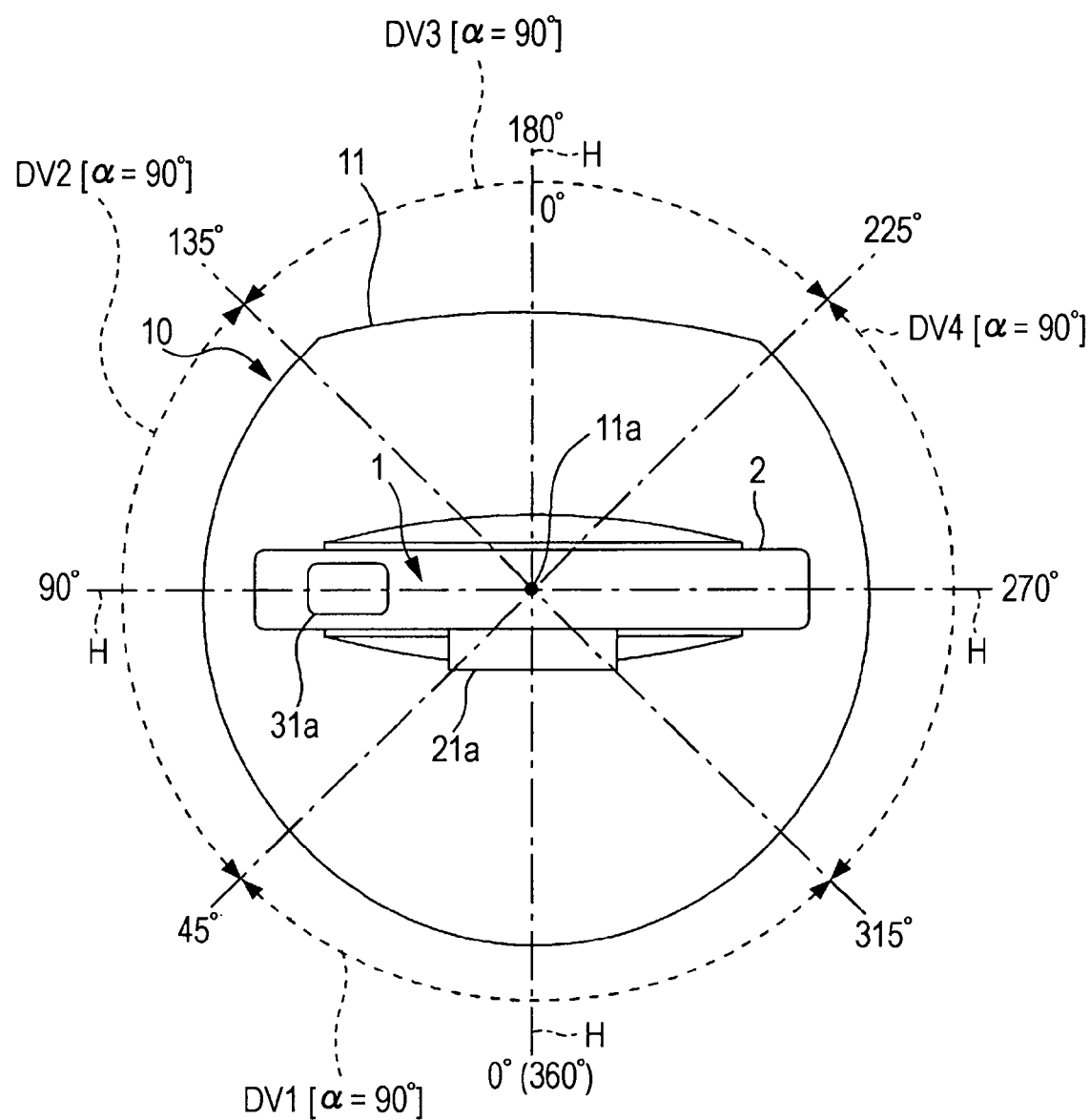
FIG. 14 illustrates an operation when an effective search range is not limited as an object search operation according to the embodiment.

In FIG. 14, a pan angle of 360 degrees is divided into four partial search ranges (movable angular ranges in the pan direction), that is, a first partial search range DV1 to a fourth partial search range DV4. Here, the four partial search ranges are equiangular. That is, the angular range in the pan direction of one partial search range is 90 degrees. In addition, the angular range in the pan direction of each of the first partial search range DV1 to the fourth partial search range DV4 corresponds to the horizontal search angle α.

As mentioned above, in the search pattern shown in each of FIGS. 12 and 13 according to the embodiment, the horizontal center position H is determined in accordance with the pan position at the start of the object search operation. Therefore, the horizontal center position H of each of the first partial search range DV1 to the fourth partial search range DV4 can be set for every 90 degree interval at any pan position in the pan angular range of from 0 degrees to 360 degrees. However, in FIG. 14, for simplifying the figure and the description, the horizontal center position H of the horizontal partial search range DV1 is shown as coinciding with a pan reference position.

As shown in FIG. 14, movements in the object search operation when the first partial search range DV1 to the fourth partial search range DV4 are prescribed are as follows.

First, in the pan angular range of the first partial search range DV1, the pan head 10 is made to move completely once in accordance with the two-dimensional search pattern shown in FIG. 12. At this time, the horizontal center position H in FIG. 12 corresponds to the pan position of 0 degrees. +α/2 degrees in FIG. 12 corresponds to the pan position of 45 degrees, and −α/2 degrees in FIG. 12 corresponds to the pan position of 315 degrees. That is, the first partial search range DV1 in this case is set to an angular position range of from the pan position of 315 degrees to (0 degrees) to 45 degrees.

When the pan head 10 is made to move completely once in the first partial search range DV1 in accordance with the two-dimensional search pattern shown in FIG. 12, the pan head 10 is subsequently moved in the pan direction so that the image pickup direction F1 is at the pan position of 90 degrees. The pan position of 45 degrees is set as in the figure, and corresponds to the horizontal center position H in the pan angular range of the second partial search range DV2. Here, the pan head 10 is made to move completely once in the second partial search range DV2 in accordance with the two-dimensional search pattern shown in FIG. 12.

Subsequently, similarly, the pan head 10 is moved to the pan position of 180 degrees, which is the horizontal center position H in the third partial search range DV3, so as to move completely once in the third partial search range DV3 in accordance with the two-dimensional search pattern shown in FIG. 12. Then, the pan head 10 is moved to the pan position of 270 degrees, which is the horizontal center position H in the fourth partial search range DV4, so as to move completely once in the fourth partial search range DV4 in accordance with the two-dimensional search pattern shown in FIG. 12.

In this way, the pan head 10 is moved completely once in accordance with the two-dimensional search pattern through the first partial search range DV1, the second partial search range DV2, the third partial search range DV3, and the fourth partial search range DV4 in that order, so that the object search operations for all of the search ranges that can be searched are performed completely once. Subsequently, the search operations in which the pan head 10 is moved completely once in accordance with the two-dimensional search pattern shown in FIG. 12 through the first partial search range DV1, the second partial search range DV2, the third partial search range DV3, and the fourth partial search range DV4 in that order are repeated.

If, on the basis of the aforementioned search operations, an object is found at, for example, the pan/tilt position included in the first partial search range DV1, for example, the digital still camera 1 performs a framing matching control operation to perform an image pickup recording operation. Then, if, for example, the image pickup recording operation for the necessary number of photographs is completed, the pan head 10 is moved to the next second partial search range DV2 to perform the search operation.

4-2. When Rotation Angle is Limited: Effective Rotation Angle=180 Degrees

The example shown in FIG. 14 corresponds to that in which the rotation angle (effective search range (effective movable angular range)) in the pan direction of the pan head 10 is not limited. In this case, as can be understood from the description of FIG. 14, the image pickup system consequentially allows the digital still camera 1 to rotate by 360 degrees or more without limit in the pan direction, to search for an object for performing an image pickup operation. However, considering an actual use of the digital still camera 1, depending upon the circumstances, rotating the digital still camera 1 without limit may not be desirable.

For example, when the digital still camera 1 is used at, for example, a restaurant, if the digital still camera 1 is rotated by 360 degrees or more in the pan direction to search for an object, an image-pickup recording operation may also be performed on other completely unrelated persons at another table.

When, for example, at home, the image pickup system according to the embodiment is placed in front of a television set and an attempt is made to automatically photograph a family watching an image displayed on television, the television is photographed at the back half portion of the image pickup system. Therefore, if the image pickup system searches for an object by rotating the digital still camera 1 by 360 degrees or more in the pan direction, its search operation becomes very inefficient.

Accordingly, in the embodiment, the maximum angle (effective search range) to which the pan head 10 can be rotated in the pan direction for searching for an object can be limited. In the embodiment, first, a user can choose whether or not to limit the effective search range and perform a setting operation by operating the digital still camera 1. If the user chooses to limit the effective search range, the user can select an angle for the effective search range from among a plurality of choices. In this case, any number of choices may be provided. Here, the number of choices is two, that is, 180 degrees and 90 degrees.

That is, in the embodiment, the user can choose from three choices for the effective search range, that is, [1] unlimited, [2] limited to 180 degrees, and [3] limited to 90 degrees.

When the pan head 10 according to the embodiment is formed to function as a cradle of the digital still camera 1, an AC adapter, an image signal cable, etc., may be connected to the pan head 10.

In a specific example, an AC adapter terminal or image output terminal jacks are provided at the back surface of the pan head 10. When plugs are inserted into the terminal jacks, if the effective search range is unlimited, cables connected to the terminals are improperly routed and are in the way. Therefore, the image pickup system is formed so as to be capable of detecting insertion of any plug into its corresponding terminal jack of the pan head 10, and automatically limits and sets the effective search range to 180 degrees or 90 degrees if a plug is inserted into its corresponding terminal jack of the pan head 10.

Figure 15:
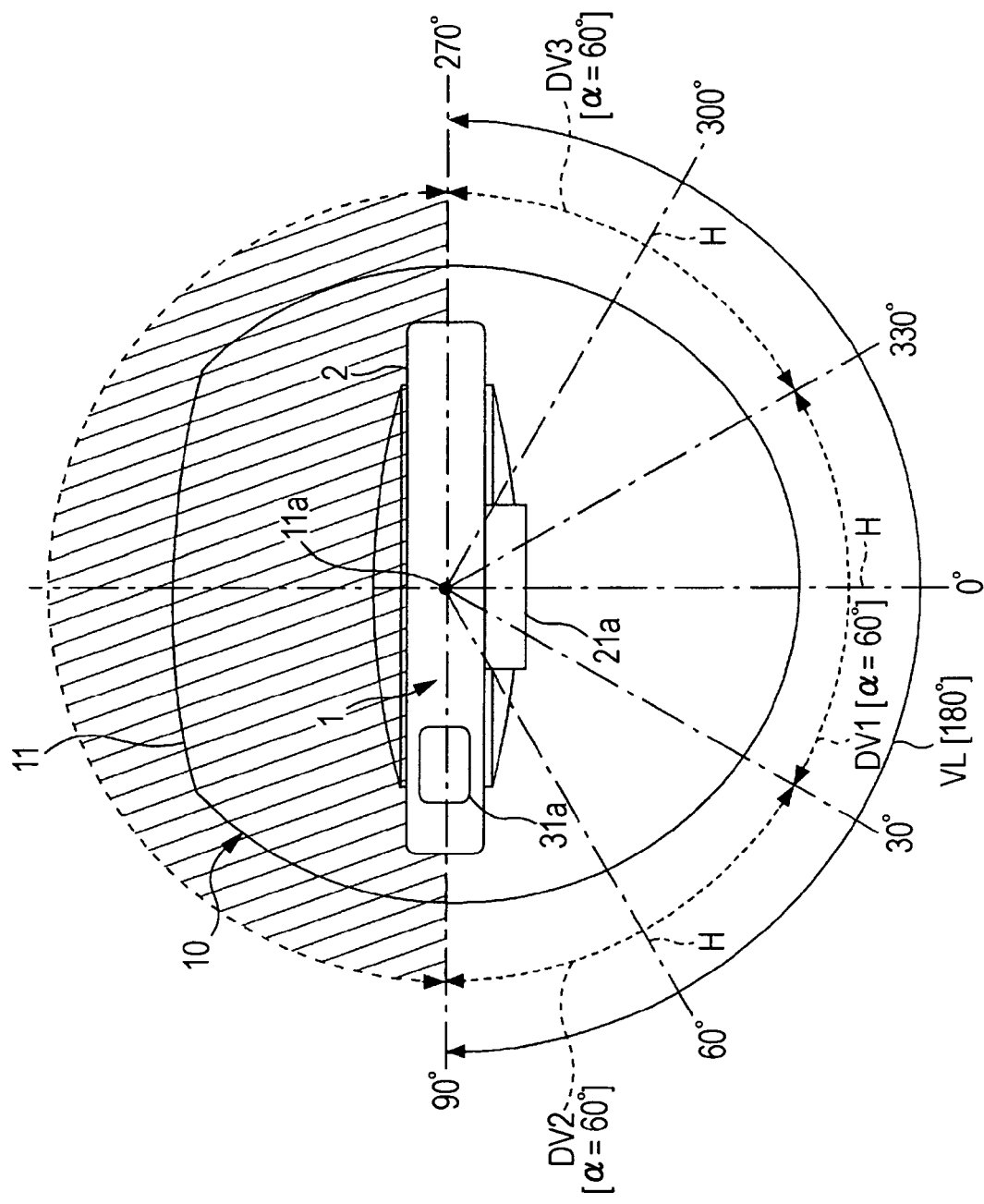
FIG. 15 illustrates an operation when the effective search range is limited to 180 degrees as the object search operation according to the embodiment.

FIG. 15 shows an example of setting partial search ranges corresponding to when the angle of an effective search range VL is limited and set to 180 degrees.

In FIG. 15, the effective search range VL of 180 degrees is divided into three ranges, a first partial search range DV1, a second partial search range DV2, and a third partial search range DV3. Accordingly, horizontal search angles α of the first partial search range DV1, the second partial search range DV2, and the third partial search range DV3 are set to 60 degrees.

If, in accordance with the setting of the partial search ranges shown in FIG. 14, the effective search range VL is simply set to 180 degrees, two partial search ranges whose horizontal search angles are α=90 degrees are set. However, if the effective search range is limited, a range in which an object is to be searched for in the pan direction is correspondingly narrowed, as a result of which the time that is taken for one complete object search in an entire searchable range is reduced. For example, if the search time when the effective search range shown in FIG. 14 is unlimited is reduced by an amount that does not practically create problems, when the effective search range is limited, the object search can be more carefully performed.

Accordingly, when the angle of the effective search range VL is set to 180 degrees, as shown in FIG. 15, the number of partial search ranges is three, which is larger than two, and the horizontal search angle α of one partial search range is 60 degrees, which is smaller than that in FIG. 14.

The search operation in this case is as follows.

First, in a pan angular range of the first partial search range DV1, the pan head 10 is moved completely once in accordance with the two-dimensional search pattern shown in FIG. 12. Here, the horizontal center position H in FIG. 12 corresponds to a pan position of 0 degrees, +α/2 degrees in FIG. 12 corresponds to a pan position of 30 degrees, and −α/2 degrees in FIG. 12 corresponds to a pan position of 330 degrees.

When, at the first partial search range DV1, the pan head 10 has been moved completely once in accordance with the two-dimensional search pattern shown in FIG. 12, the pan head 10 is subsequently moved in the pan direction so that the image pickup direction F1 is oriented towards a pan position of +60 degrees. The pan position of +60 degrees corresponds to the horizontal center position H in a pan angular range of the second partial search range DV2 of this case. Accordingly, at the second partial search range DV2, the pan head 10 is moved completely once in accordance with the two-dimensional search pattern DV2 shown in FIG. 12.

Next, the pan head 10 is moved in the pan direction so that the image pickup direction F1 is oriented towards a pan position of +300 degrees. The pan position of +300 degrees corresponds to the horizontal center position H in a pan angular range of the third partial search range DV3 of this case. Accordingly, similarly to the above, at the third partial search range DV3, the pan head 10 is moved completely once in accordance with the two-dimensional search pattern shown in FIG. 12.

Accordingly, by causing the pan head 10 to move completely once in accordance with the two-dimensional search pattern at the first partial search range DV1, the second partial search range DV2, and the third partial search range DV3 in that order, the entire searchable range is searched once. Subsequently, the above-described search operation is repeated.

If, for example, during the above-described search operation, an object is found in the first partial search range DV1, for example, as mentioned above, the image pickup system performs a framing matching control operation, and, then, performs an image-pickup recording operation. Then, when, for example, the image-pickup operation for the necessary number of photographs is completed, the pan head 10 is moved in the second search range DV2 to subsequently perform a search operation.

The movements in the partial search ranges may be simply performed in the clockwise or the counterclockwise direction. More specifically, if the movements are performed clockwise, in the case shown in FIG. 15, the movements are performed in the third partial search range DV3, the first partial search range DV1, and the second partial search range DV2 in that order.

However, as mentioned above, an object exists in a pan-position direction with high probability at the start of an object search operation. Therefore, in the embodiment, the object search operation is started from the partial search range where the pan position is situated in correspondence with the horizontal center position H at the start of the object search operation.

4-3. When Rotation Angle is Limited: Effective Rotation Angle=90 Degrees

Figure 16:
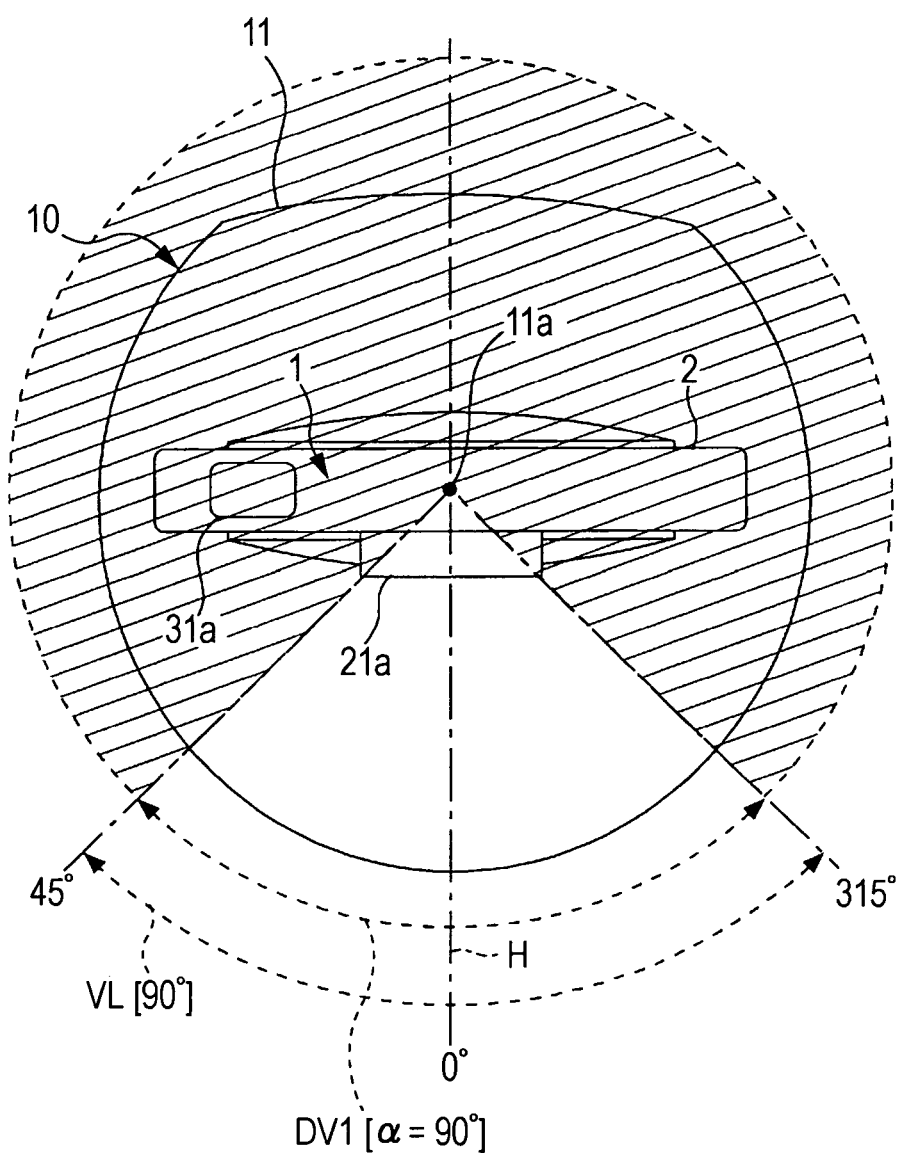
FIG. 16 illustrates an operation when the effective search range is limited to 90 degrees as the object search operation according to the embodiment.

FIG. 16 shows an example of setting partial search ranges corresponding to when an effective search range VL is set to 90 degrees.

In this case, in the effective search range VL of 90 degrees, one partial search range DV1 whose horizontal search angle α is 90 degrees is set. In a search operation of this case, at the first partial search range DV1, a panning/tilting operation is performed once in accordance with the search pattern shown in FIG. 12. Then, this search operation is repeated.

In this case, for example, two partial search ranges DV whose horizontal search angles α are 45 degrees may be set in the effective search range VL of 90 degrees. Alternatively, it is obviously possible to set three partial search ranges whose horizontal search angles α are set to 30 degrees.

However, in this case, only one partial search range DV is set for, for example, the following reasons.

At present, wide-angle lenses whose focal lengths are 28 mm (converted value=35 mm) or less are beginning to be widely used even in digital still cameras. Therefore, depending upon the angle of field at the wide-angle end of a lens of the digital still camera 1, if the horizontal search angle α is made too small, the ranges are repeatedly searched more than necessary. Therefore, a good search result may not be frequently provided. Here, in this example, when, considering such a fact, the effective search range VL is set to 90 degrees and is, thus, very narrow, one partial search range having the same horizontal search angle α is set.

For the same reason, for example, when the previously mentioned effective search range is 180 degrees, for example, as shown in FIG. 15, the horizontal search angles α are set to 60 degrees instead of setting the horizontal search angles to 45 degrees or 30 degrees.

5. Algorithm According to Embodiment

5-1. Basic Example

Basic examples of algorithms for performing an automatic image-pickup recording operation including an object search operation in the embodiment described thus far are described with reference to FIGS. 17 to 21.

The flowchart shown in FIG. 17 shows an entire first exemplary algorithm for performing an object search operation. The operation shown in FIG. 17 may been considered as being executed when necessary by each functional member of the digital still camera 1 shown in FIG. 9. The operation executed by each of these functional members can be considered as a control/processing procedure executed when the control section (CPU) 27 shown in FIG. 7 executes a program. This point also similarly applies to the flowcharts of subsequent figures.

Until the operation shown in FIG. 17 is started, the effective search range is set to any one of the conditions [1] unlimited, [2] limited to 180 degrees, and [3] limited to 90 degrees in accordance with the operation of a user or a detection result of, for example, whether or not a cable is connected to the pan head 10. Then, for example, if a trigger for starting an automatic image-pickup recording operation in accordance with, for example, the operation of the user is obtained, the controlling section 27 executes Step S101 and the steps subsequent to Step S101.

First, in Step S101, as parameters corresponding to a currently set effective search range, a horizontal search angle α and the number of partial search ranges N are set.

The operation of the Step S101 in the first example is shown in the flowchart of FIG. 18A.

For example, the effective search range that has been set in accordance with the operation of the user or whether or not a cable is connected to the pan head 10 is stored in, for example, RAM 29 as effective search range setting information.

In Step S201 shown in FIG. 18A, the controlling section 27 refers to the effective search range information, and recognizes a setting content of the currently set effective search range. That is, the controlling section 27 recognizes whether or not the effective search range is set to [1] unlimited, [2] limited to 180 degrees, or [3] limited to 90 degrees.

Next, in Step S202, the controlling section 27 refers to a parameter table for effective search ranges stored in the flash memory 30 or ROM 28.

For example, the content of the parameter table for the effective search ranges is as shown in FIG. 20. That is, the parameter table includes, for the effective search ranges, the horizontal search angles α and the values of the number of partial search ranges N corresponding to the respective conditions [1] unlimited, [2] limited to 180 degrees, and [3] limited to 90 degrees.

From the parameter table for the effective search ranges, the controlling section 27 obtains the horizontal search angle α and the value of the number of partial search ranges N corresponding to the setting of the current effective search range recognized in the Step S101. Then, in Step S203, the horizontal search angle α and the number of partial search ranges N obtained in the Step S202 are set as object search parameters in a present automatic image-pickup recording operation.

In Step S102 shown in FIG. 17, 1 is substituted for a variable n. Then, in Step S103, initialization in which 1 is substituted for a variable m is executed.

The variable n represents the number of a partial search range. In the embodiment, if an object is detected once, image-pickup recording operations for different framings are executed a plurality of times (such as approximately three times) on the detected object. Then, the next object search is performed. The variable m represents the number of image-pickup recording operations that are performed for each detected object.

In Step S104, zoom control is executed so that a prescribed angle of field for the object search is set.

There are various ways of setting the prescribed angle of field for the object search. Here, the most basic way is used to set the widest angle of field (hereunder referred to as "wide-angle-end angle") obtained by an image pickup lens of the optical system section 21. By setting the wide-angle-end angle, the image pickup viewing angular range obtained by the lens becomes widest, so that the object can be correspondingly efficiently detected.

FIG. 18B shows an operation for setting the wide-angle-end as an angle of field for the object search as Step S104. In Step S301, the controlling section 27 executes the zoom control so that the image pickup lens is set at the wide-angle end.

In Step S105, pan/tilt control for search an nth partial search range DVn is started. That is, the pan/tilt control is executed so that a panning/tilting movement in accordance with the two-dimensional search pattern, previously described with reference to FIG. 12 or FIG. 13, is obtained in the nth partial search range DVn.

The structure for the pan/tilt control for the two-dimensional search pattern may be as follows.

In one example, the controlling section 27 (the pan/tilt/zoom control block 63) of the digital still camera 1 gives instructions regarding, for example, the pan/tilt movement direction, the pan/tilt movement amount, and the movement speed to the controlling section 51 (the pan/tilt control processing block 72) of the pan head 10 so that panning and tilting are performed in accordance with, for example, the arrows Sc1 to Sc12 forming the two-dimensional search pattern shown in FIG. 12.

In another example, for example, a panning/tilt pattern for object search corresponding to the arrows Sc1 to Sc12 of the two-dimensional search pattern shown in FIG. 12 is stored. Then, the controlling section 27 (the pan/tilt/zoom control block 63) of the digital still camera 1 gives an instruction to the controlling section 51 (the pan/tilt control processing block 72) of the pan head 10 to move the pan head 10 to a pan position corresponding to a horizontal center position H in the nth partial search range DVn. Then, the controlling section 27 specifies a horizontal search angle α and gives an instruction to completely search for an object once in accordance with the two-dimensional search pattern. In accordance with this instruction, the controlling section 51 (the pan/tilt control processing block 72) of the pan head 10 calls out the two-dimensional search pattern that is stored, and performs a panning/tilt driving operation. At this time, panning at an angle corresponding to the specified horizontal search angle α is executed in a movable range in the pan direction. With this structure, even if the digital still camera 1 is not capable of performing pan/tilt driving control for the two-dimensional search pattern, the movements for object search in accordance with the two-dimensional search pattern can be achieved by, for example, only giving an instruction to search the nth partial search range DVn.

In a state in which the pan/tilt movement in accordance with the two-dimensional search pattern is obtained at the nth partial search range DVn when the Step S105 is started, the controlling section 27 waits for the detection of an object in Step S106.

Therefore, the controlling section 27 executes an object detection operation by making use of image-pickup image data taken in by the framing determining block 62 (the signal processing section 24). The object detection operation uses, for example, a face detection technology, and sets a face frame corresponding to an area of an image of the face for each detected object as a result of the detection. For example, pieces of basic information regarding objects, such as the number of objects, the sizes of the objects and the positions of the objects within picture frames when the objects are detected can be obtained from, for example, the position, the size, and the number of face frames FR. In accordance with the setting of the face frames FR, at this stage, the center of gravity of each object or the overall center of gravity of a plurality of objects can be obtained.

Several methods of detecting the face are available. In the embodiment, the method used is not particularly limited to these several methods. However, considering, for example, detection precision and design difficulty, a method that is considered suitable may be used.

Here, in Step S106, until the object search is completely performed once in accordance with the two-dimensional search pattern at the nth partial search range DVn by the object detection operation, detection of at least one object is waited for. Here, if it is determined that an object has been detected, the process proceeds to Step S107 on. In contrast, if an object is not detected, the process proceeds to Step S112.

In Step S107, a framing determining operation and framing matching control in accordance with framing determination results are executed.

When an object has been detected, object information, such as face-frame-FR information (position, size, etc.); the center of gravity of each object and the overall center of gravity; and age, sex, and face direction (detected as attributes) can be obtained for each detected object.

In Step S107, the controlling section 27 (the framing determining block 62) executes the framing determining operation for determining an optimal framing by making use of the aforementioned object information.

By the framing determining operation, for example, whether or not the center of gravity of an object exists at a proper position in a picture frame, or a zoom magnification (magnification of the size of the object) is determined. Information regarding framing determining results of the framing determining operation is given to, for example, the pan/tilt/zoom control block 63.

Accordingly, the pan/tilt/zoom control block 63 executes pan/tilt/zoom control for obtaining an image-pickup viewing angle corresponding to the received framing determination results. That is, the framing matching control is executed.

After the framing matching control has been started in the Step S107, in Step S108, the controlling section 27 (the framing determining block 62) determines whether or not the framing actually determined as an image of image-pickup image data at that time is the same as the framing determined in Step S107 (for example, whether or not the framing that is actually determined is similar to the framing determined in Step S107 by a certain degree or by a degree that is more than the certain degree). That is, the controlling section 27 determines whether or not the framing is OK.

The digital still camera 1 according to the embodiment can detect at least a smile of a person as a facial expression of a detected subject (object). Here, the framing determination results may include, for example, the content for specifying that the subject is smiling. If the framing determination results include the specification that the subject is smiling in this way, when determining whether or not the framing is OK in Step S108, the detection result regarding whether or not the subject is smiling is also used.

Here, if, for example, the framing is not OK after waiting for a certain time in a state in which a pan/tilt/zoom driving operation is performed on the basis of a movement amount that is necessary for the frame matching, a determination result that the framing is not OK is obtained In Step S108. In this case, the process proceeds to Step S112.

In contrast, if a determination result that the framing is OK is obtained in Step S108, the process proceeds to Step S109.

In Step S109, for example, the controlling section 27 gives an instruction for performing an image pickup recording operation to the image pickup recording block 61. In accordance with the instruction, image-pickup image data obtained at this time is recorded as a still image file on the memory card 40. When the operation of Step S109 is an operation that is performed first in accordance with the detection of the subject in the last Step S106, first, a first piece of image-pickup image data is recorded for the detected subject.

After incrementation of the variable m in Step S110, the controlling section 27 determines whether or not the variable m is greater than a maximum value in Step S111. Here, the maximum value with which the variable m is compared corresponds to the number of times image-pickup recording is to be performed by changing a framing of a subject detected once. For example, if the number of times image-pickup recording is to be performed is three times, the maximum value here is 3.

If, in Step S111, the variable m is less than or equal to the maximum value, and a determination result is no, image-pickup recording for a prescribed number of times has not yet been performed on the detected subject. In this case, the process returns to Step S107, and a framing determining operation and framing matching control for the next image-pickup recording are executed. The frame determining operation for this time is performed for setting a framing differing from that of the previous framing determining operation. For example, the orientation of the face of a subject for a framing may be set to an orientation differing from the previous orientation. In addition, for example, the position and size of the subject in a picture frame may be changed and set. In the previous operation, it is not necessary for the subject to smile, but the condition that the subject smiles may be set this time.

If, for every subject that is detected in this way, image-pickup recording for the prescribed number of times is performed, a plurality of image-pickup images for different framings of the same subject may be recorded.

As described above, the image-pickup recording is performed for the prescribed number of times on the subject detected once. When the image-pickup recording for the prescribed number of times ends, a determination result of "yes" is obtained in the Step S111, and the process proceeds to Step S112.

When the process reaches the Step S112, the following cases may occur. One case is that, even if, at the nth partial search range DVn, an object search is completely performed once in accordance with the two-dimensional search pattern, an object is not detected, and the detection result is "no" in the Step S106. Another case is that, even if an object is detected and framing matching control is executed, the framing is not OK, and the detection result is "no" in Step S108. Still another case is that, image-pickup recording performed on the detected object for the prescribed number of times ends, and the determination result is "yes" in the Step S111.

In either of these cases, the search with respect to the nth partial search range DVn ends, and the present range may be shifted to the next partial search range.

Accordingly, after incrementation of the variable n in Step S112, the controlling section 27 determines whether or not the variable n is greater than the number of partial search ranges N in Step S113.

If, in Step S113, the variable n is less than or equal to the number of partial search ranges N, and the determination result is "no," object searches have not yet been completely performed once for all of the respective partial search ranges. Therefore, in this case, the process returns to the Step S103. By this, the object search of the next nth partial search range is started in accordance with the two-dimensional search pattern. Even if, for example, zooming is performed by the previous framing matching control when the Step S104 is performed again, resetting is performed so that the angle of field (that is, a telephoto-end angle in this case) for the search is set.

Then, as a result of repeating the operations after returning from the Step S113 to the Step S103, at a certain stage when the object searches have been completely performed once for all of the respective partial search ranges in accordance with the two-dimensional search pattern, the determination result is "yes" in the Step S113. In this case, the process returns to the Step S103. By this, the object search from the first partial search range DV1 in accordance with the two-dimensional search pattern is started again.

5-1-1. Modification of Parameter Setting

Here, modifications of setting the parameters (the horizontal search angle α, the number of partial search ranges N) in the Step S101 shown in FIG. 17 will be given.

First, a parameter table for ranges corresponding to effective search ranges having the content shown in FIG. 21 is used instead of the parameter table having the content shown in FIG. 20.

In the parameter table for the ranges corresponding to the effective search ranges shown in FIG. 21, the horizontal search angles α and the numbers of partial search ranges N for respective settings of the effective search ranges are shown for when the field-angle value γ at the wide-angle end of a lens of the optical system section 21 (that is, a wide-angle-end field-angle value) is greater than or equal to a predetermined value and for when the field-angle value γ is less than the predetermined value.

The field-angle value γ here is represented by a focal length. Here, the field-angle value γ of the lens is only an example, and is set as being either greater than or equal to 25 mm (focal length: converted value of 35 mm) or less than 25 mm.

The content of the parameter table for the ranges corresponding to the effective search ranges shown in FIG. 21 when the field-angle value γ is greater than or equal to 25 mm is the same as that in FIG. 20.

In contrast, if the field-angle value γ is less than mm and the range corresponding to the effective search range is unlimited, the number of partial search ranges N is 3 when the horizontal search angle α is 120 degrees. If the range corresponding to the effective search range is limited to 180 degrees, the number of partial search ranges N is 2 when the horizontal search angle α is 90 degrees. If the range corresponding to the effective search range is limited to 90 degrees, the number of partial search ranges N is 1 when the horizontal search angle α is 90 degrees. The horizontal angle α when the range corresponding to the effective search range is unlimited and that when the range corresponding to the effective search range is limited to 180 degrees are greater for the case in which the field-angle value γ is less than 25 mm than for the case in which the field-angle value γ is greater than or equal to 25 mm. The numbers of partial search ranges N are correspondingly reduced.

The number of partial search ranges N and the horizontal search angle α corresponding to one effective search range are changed in accordance with the wide-angle-end field-angle value of the lens in this way for the following reasons.

For the lenses of a digital still camera, lenses having a wide angle of field tend to be actually used. As the angles of field of the lenses of the digital still camera 1 become very wide, the range in which object search can be performed at a fixed position is also increased. Taking this into consideration, even if the lenses have angles of field that are greater than or equal to a certain angle of field, for the horizontal search angles α and the numbers of partial search ranges N for defaults assuming, for example, a telephoto-end angle of approximately 35 mm, there are too many areas that are repeatedly searched for the respective partial search ranges. Therefore, there may be cases where the object search is not very efficiently performed.

Consequently, in a modification, when a lens having a wide-angle-end field-angle value γ that is greater than or equal to a certain value is used, the horizontal search angle α is made larger than usual, and the number of partial search ranges DV is correspondingly reduced. In the example shown in FIG. 21, if the effective search range is limited to 90 degrees, the number of partial search ranges N is 1 and the horizontal search angle α is 90 degrees regardless of the wide-angle-end field-angle value γ. This is because, for example, when the effective search range is limited to a relatively narrow range of 90 degrees, further increasing the horizontal search angle α is not particularly meaningful.

The flowchart shown in FIG. 19 indicates an exemplary processing procedure of the Step S101 shown in FIG. 17 corresponding to a modification of setting the parameters.

In Step S401 shown in FIG. 19, as in the Step S201 shown in FIG. 18A, the controlling section 27 refers to the effective search range information, and recognizes a setting content of a currently set effective search range.

Next, in Step S402, the controlling section 27 obtains a wide-angle-end field-angle value γ of a lens of the optical system section 21. If, for example, the lens is assembled in the digital still camera 1, information regarding the wide-angle-end field-angle value γ of the lens is held in the flash memory 30 or ROM 28. If the lens is replaceable, an interchangeable lens holds data regarding its wide-angle-end field-angle value γ. Accordingly, in this case, when the controlling section 27 of the digital still camera 1 performs communication with, for example, a CPU at the replaceable lens, the wide-angle-end field-angle value γ can be obtained.

In Step S403, the controlling section 27 refers to the parameter table for the ranges corresponding to the effective search ranges shown in FIG. 21. Then, the horizontal search angle α and the number of partial search ranges N made to correspond to the setting of the effective search range recognized in the Step S401 and the wide-angle-end field-angle value γ obtained in the Step S402 are obtained.

In one example, when the wide-angle-end field-angle value γ obtained in the Step S402 is 24 mm, and the setting of the effective search range recognized in the Step S401 is limited to 180 degrees, a horizontal search angle α of 90 degrees and the number of partial search ranges N equal to 2 are obtained as parameters corresponding thereto in Step S402.

Then, in the Step S404, the horizontal search angle α of 90 degrees and the number of partial search ranges N equal to 2 obtained in the Step S403 are set as parameters for object search in a current automatic image-pickup recording.

6. Fourth Exemplary Object Search Movement: Second Exemplary Partial Search Range Setting Operation In the first exemplary partial search range setting operation described thus far, the rotation angles in the pan direction of 360 degrees, 180 degrees, and 90 degrees are equally divided into the first partial search range DV1 to an nth partial search range DVn by the same horizontal search angle α, and are set. In this case, an angular range in the pan direction is set so as not to overlap the other partial search ranges. When searching of one partial search range ends, searching of the next partial search range is performed, so that an angular range in the pan direction does not overlap the other partial search ranges.

In contrast, in the second example, the partial search ranges are set as described below.

Figure 22A:
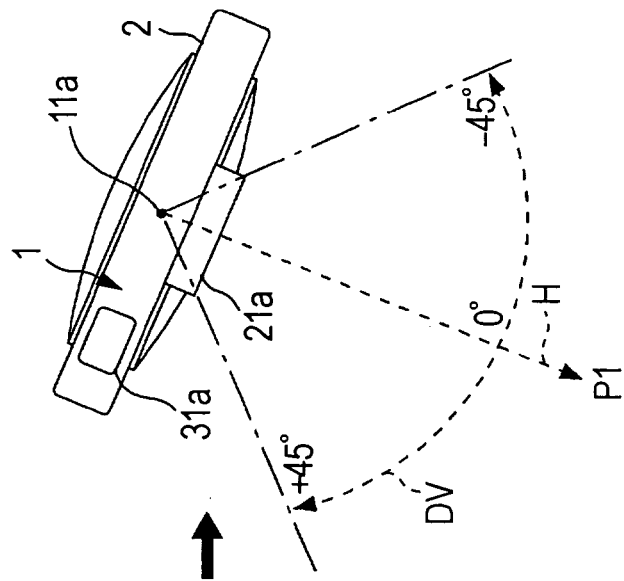
FIGS. 22A to 22C illustrate an exemplary basic operation in a second exemplary partial search range setting operation.
Figure 22B:
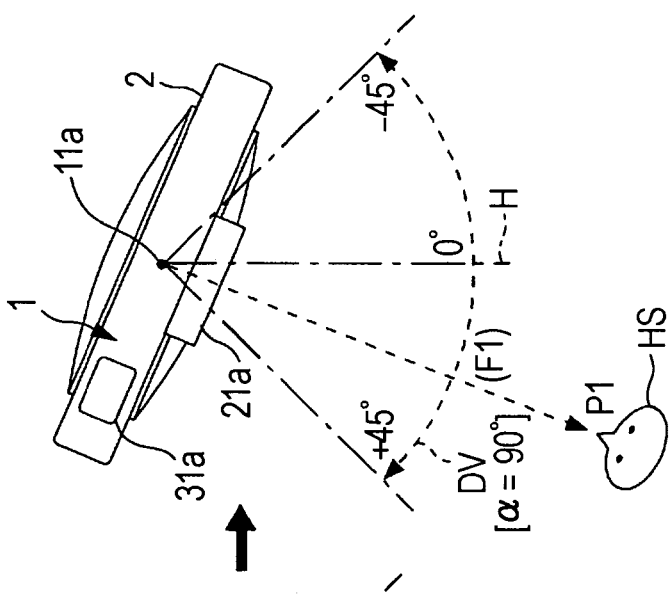
Figure 22C:
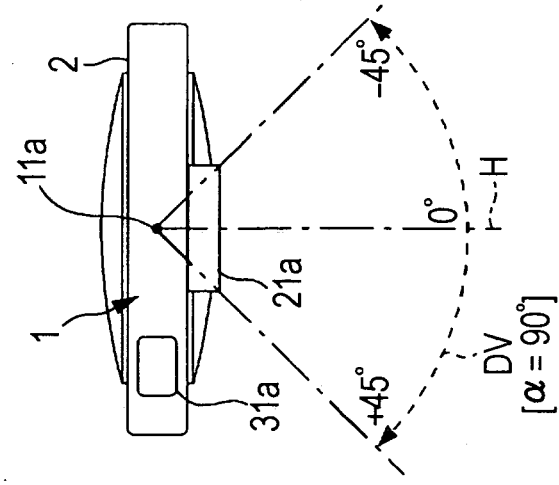

FIGS. 22A to 22C show how the second exemplary partial search range setting operation is carried out, and exemplary movements of object search. Although the digital still camera 1 shown in FIGS. 22A to 22C is placed on the pan head 10, the pan head 10 is not shown for simplifying and making it easier to view FIGS. 22A to 22C.

Here, by the pan head 10, the digital still camera 1 executes the object search at a partial search range DV shown in FIG. 22A in accordance with the two-dimensional search pattern shown in FIG. 12 or FIG. 13. Here, the horizontal search angle α at the partial search range DV is, for example, 90 degrees.

When the object search is being carried out in the partial search range DV shown in FIG. 22A, while the image pickup direction F1 of the digital camera 1 is oriented towards a position shown in FIG. 22B, an object HS is detected. It is assumed that image-pickup recording of this object is completed.

Here, a pan position corresponding to the image pickup direction F1 when the object is detected in FIG. 22B is P1. A partial search range where the next object search is performed is set from +45 degrees to −45 degrees with the pan position P1 being the horizontal center position H (0 degrees).

FIGS. 23A to 23C show another example of the second exemplary partial search range setting operation.

Here, the succession of movements from that in FIG. 23A to that in FIG. 23B is the same as the succession of movements from that in FIG. 22A to that in FIG. 22B.

In the another example, as shown in FIG. 23C, a pan position resulting from a rotation of 90 degrees in the pan direction from the pan position P1 corresponding to the image pickup direction F1 when the object is detected in FIG. 23B is set to a new horizontal center position H (0 degrees). A range of 90 degrees from +45 degrees to −45 degrees with the new horizontal center position H (0 degrees) being the center in the pan direction is set as the next partial search range DV.

That is, whereas, in the operation shown in FIGS. 22A to 22C, the pan position where the object is detected is set as the horizontal center position H of the new partial search range DV, in the operation shown in FIGS. 23A to 23C, the pan position resulting from a rotation in the pan direction by a previously set predetermined angle from the pan position where the object is detected is set as the horizontal center position H of the new partial search range DV.

Accordingly, in the rotational movements in the pan direction in the second example shown in FIGS. 22A to 22C and FIGS. 23A to 23C, the pan head 10 is not moved in a previously divided partial search range DV, but is set at the new partial search range DV by determining the new horizontal center position H (0 degrees) on the basis of the image pickup direction F1 when the object is detected. Then, such object search of a newly set partial search range DV is repeated.

By performing the object search in this way, the search is carefully performed. Depending upon, for example, surrounding conditions such as the number of people that are subjects being considerably large, it is possible to automatically record image-pickup image data having a picture content that is more desirable than that in, for example, the first example.

Even in the second example, until an object is detected from the start of the object search, as in, for example, FIGS. 14 and 15 showing the first example, after equally dividing the angular range into the first partial search range DV1 to an nth partial search range DVn, the object search is completely performed once in accordance with the two-dimensional search pattern while successively moving the pan head 10 through the partial search ranges. Then, when an object is detected, object searches of the partial search ranges shown in FIGS. 22A to 22C or FIGS. 23A to 23C are executed. If, for example, an object is not detected after the object search has been performed by the partial search range setting shown in FIGS. 22A to 22C or FIGS. 23A to 23C, the process returns to the first exemplary operation for executing object search for each of the divided first partial search range DV1 to an nth partial search range DVn.

If, in the operation in the second example, the effective search range is unlimited, the movements shown in FIGS. 22A to 22C are performed either clockwise or a counterclockwise.

In contrast, if, for example, as shown in FIGS. 15 and 16, the effective search range is limited to less than 360 degrees, when the partial search range DV is set to a position of limit of the effective search range, it is necessary to consider how to return to the opposite side in the pan direction.

Accordingly, exemplary rotational movements when the effective search range is limited will be described with reference to FIGS. 24A and 24B and FIGS. 25A and 25B. Here, the angle of the limited effective search range VL is 180 degrees, and the horizontal search angle α of the partial search range DV is 60 degrees.

Here, for the effective search range VL of 180 degrees, with the center thereof being 0 degrees, a limit position is +90 degrees in the clockwise direction, and a limit position is -90 degrees in the counterclockwise direction.

FIGS. 24A and 24B and FIGS. 25A and 25B schematically show search operations without showing the pan head 10 and the digital still camera 1. Here, the rotating shaft 11a of the body of the digital still camera 1 is shown.

Here, first, when the effective search range VL of 180 degrees is being searched, as shown in FIG. 24A, an object HS is detected when the image pickup direction F1 is oriented towards a pan position of -75 degrees, and automatic image-pickup recording ends.

In this case, the horizontal search angle α is 60 degrees. Therefore, in the second example, the pan position that is in correspondence with the image pickup direction F1 shown in FIG. 24A is set as a horizontal center position H. Accordingly, for the partial search range DV that is set in this case, as shown in FIG. 24B, a search angle (+2/α) of 30 degrees in the clockwise direction from the horizontal center position H (-75 degrees) to -45 degrees can be provided. However, in the counterclockwise direction, a search angle of 15 degrees from the horizontal center position H (-75 degrees) to -90 degrees can only be provided.

However, in the operational example in this case, a range of from -45 degrees to H (-75 degrees) to -90 degrees is set as the partial search range DV, and object search in accordance with the two-dimensional search pattern according to the embodiment shown in FIG. 12 or FIG. 13 is executed.

In this case, panning in the clockwise direction from the horizontal center position H (-75 degrees) is performed by 30 degrees, and panning in the counterclockwise direction from the horizontal center position H (-75 degrees) is performed by 15 degrees. Therefore, the two-dimensional search pattern in this case is not horizontally symmetrical like the two-dimensional search patterns shown in FIGS. 12 and 13, but is asymmetrical instead.

It is assumed that, for example, depending upon the object search at the partial search range DV shown in FIG. 24B, an object is not detected. In this case, the search cannot be performed in the counterclockwise direction. Therefore, it is necessary to set the partial search range DV by moving the pan head 10 clockwise in accordance with some rule.

Figure 25A:
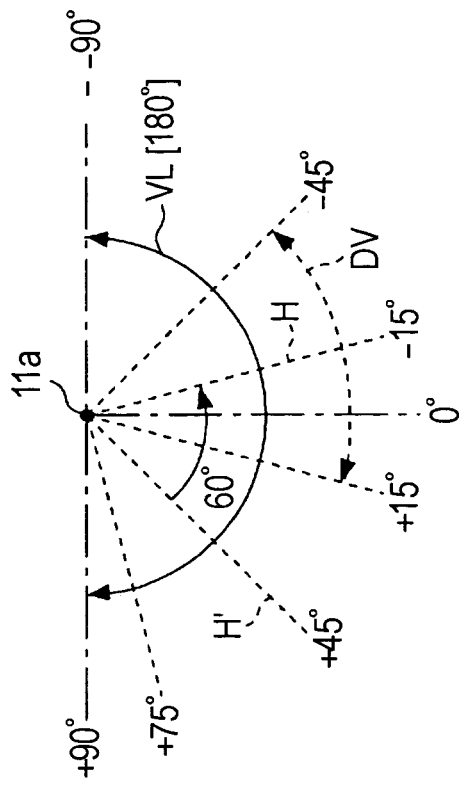
FIGS. 25A and 25B illustrate an exemplary operation when the effective search range is limited in the second exemplary partial search range setting operation.

Here, it is assumed that a new partial search range DV is set as shown in FIG. 25A. That is, panning is performed so that, if the horizontal center position of the partial search range DV set in FIG. 24A is H', a pan position of +45 degrees resulting from a rotation of 120 degrees in the clockwise direction from a pan position where the horizontal center position H' is situated becomes the horizontal center position H of a new partial search range DV. This makes it possible for the partial search range DV to be positioned at an angular range at the opposite side so as to be symmetrically situated with respect to 0 degrees. Then, object search at the new partial search range DV is executed.

The angle of rotation in the reverse direction for moving the partial search range DV is set to 120 degrees. The horizontal search angle α of 60 degrees in the partial search range DV in the effective search range of 180 degrees is a specific exemplary value that is set considering that the partial search range DV after the movement generally becomes the pan position.

Figure 25B:
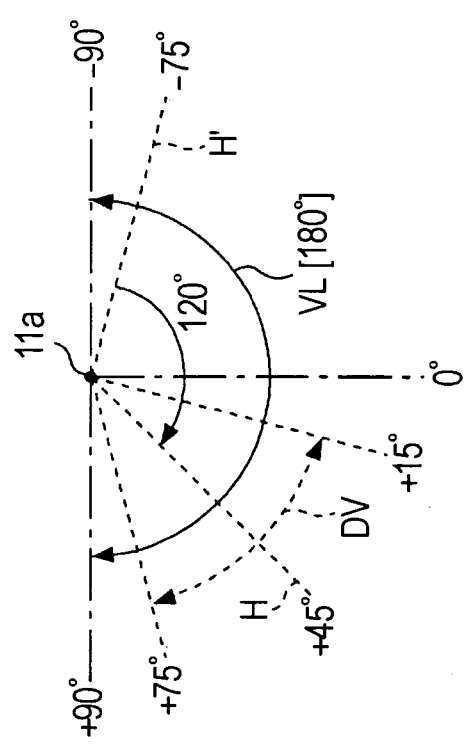

It is assumed that, as a result of performing the object search at the partial search range DV set in FIG. 25A, an object is not detected. Here, panning movement is performed so that, if, as shown in FIG. 25B, the horizontal center position of the partial search range DV set in FIG. 25A is H', a pan position of -15 degrees resulting from a rotation of 60 degrees in the counterclockwise direction from a pan position where the horizontal center position H' is situated becomes a new horizontal center position H. This makes it possible to position the next partial search range DV in substantially the vicinity of the front side near 0 degrees. Then, object search of the partial search range DV whose range is ±30 degrees (+15 degrees to -15 degrees to -45 degrees) with respect to the pan position of -15 degrees is executed.

By the movements mentioned thus far, a range of from a pan position of +90 degrees to a pan position of +75 degrees is not searched. However, even if panning is not performed from the pan position of +90 degrees to the pan position of +75 degrees, a necessary image-pickup viewing angular range for the range of from the pan position of +90 degrees to the pan position of +75 degrees can be obtained on the basis of the angle of field of a lens. Therefore, in this case, even if the range of from the pan position of +90 degrees to the pan position of +75 degrees is not searched, problems do not particularly arise.

If an object is not detected even if the object search is performed in the partial search range DV shown in FIG. 25B, for example, after the image pickup direction F is returned to 0 degrees and temporarily stopped, for example, object search of each partial search range divided as described with reference to, for example, FIG. 15 is successively executed until an object is detected.

In the description of the embodiment given thus far, the search movements in the respective partial search ranges described in FIG. 14 on are described as being performed in accordance with the two-dimensional search pattern shown in FIG. 12 or FIG. 13. However, from the viewpoint of the search movements, for example, even if search movements are those in a partial search range in which the pan head 10 simply moves in the pan direction while a certain predetermined pan position is simply set, the search efficiency is increased compared to, for example, that of the search movements in the pan direction through 360 degrees.

In the description of the embodiment given thus far, the processing procedure shown in each figure in the form of a flowchart is executed in accordance with a program that the controlling section 27 of the digital still camera 1 executes.

However, for example, at least one of the processing procedures shown in the respective figures in the form of flowcharts may be executed at the pan head 1. However, when main object search, framing determination, and automatic image-pickup recording control functions are provided in the digital still camera 1, it is possible to combine various types of digital still cameras 1 and pan heads 10, which is advantageous from the viewpoint of versatility.

In the image pickup system according to the embodiment, it is not necessary for the digital still camera 1 and the pan head 10 to be separate devices, so that they may be integrated to each other. However, if, as in the embodiment, the digital still camera 1 and the pan head 10 are formed as separate devices, the digital still camera 1 can be used as an ordinary camera.

Although, in the description given thus far, the images that are subjected to automatic image pickup recording are still images, the images may be moving images generated from images obtained by image pickup operations.

As mentioned thus far, at least part of the structure based on the application may be realized by causing a CPU or a DSP to execute a program.

After such a program is stored in a removable recording medium in addition to being written to and stored in, for example, ROM at the time of, for example, manufacture, such a program may be installed (updated) from the recording medium and stored in, for example, the flash memory 30 or a non-volatile storage area for the DSP. In addition, such a program may be installed by a control operation of a device that is another host device through a data interface such as USB or IEEE 1394. Further, such a program is stored in a storage device such as a network server, and the digital still camera 1 is provided with a network function, so that such a program can be downloaded and obtained from the server.

It should be understood by those skilled in the art that various modifications, combinations, sub-combinations and alterations may occur depending on design requirements and other factors insofar as they are within the scope of the appended claims or the equivalents thereof.

What is claimed is:

1. A movable-mechanical-section controlling device comprising:
    pan/tilt driving controlling means for performing driving control on a movable mechanical section having a structure that moves so that an image pickup direction of an image pickup section that obtains an image-pickup image by performing an image pickup operation changes in a pan direction and a tilt direction,
    wherein unit pan operations that are performed in an angular range in the pan direction are performed for the respective two or more different tilt positions with decreasing angle of elevation at the tilt positions and,
    wherein, when a unit pan operation is to be started, the pan position of the movable mechanical section at the start of the unit pan operation is set as the center pan position for the unit pan operation, such that the pan position of the movable mechanical section for the start of the unit pan operation is not determined prior to the start of the pan operation, and such that the angular range of the pan operation is centered about the pan position of the movable mechanical section at the start of the unit pan operation.

2. The movable-mechanical-section controlling device according to claim 1, wherein the pan/tilt driving controlling means performs the driving control on the movable mechanical section so that, when the unit pan operation is performed at one of the tilt positions and, then, the tilt position is moved to the next tilt position where the next unit pan operation is performed, the tilt position is moved at the new center position within the angular range in the pan direction.

3. The movable-mechanical-section controlling device according to claim 1, wherein the pan/tilt driving controlling means performs the driving control on the movable mechanical section so that, when the unit pan operation at one of the tilt positions is to be performed, the pan operation is performed completely once in one direction in the angular range in the pan direction.

4. The movable-mechanical-section controlling device according to claim 3, wherein the pan/tilt driving controlling means performs the driving control on the movable mechanical section so that, when the unit pan operation at one of the tilt positions is to be performed, the pan operation is performed completely once in one two-way direction in the angular range in the pan direction.

5. The movable-mechanical-section controlling device according to claim 1, wherein the pan/tilt driving controlling means operates to search an object that is picked up by the image pickup section.

6. The movable-mechanical-section controlling device according to claim 5, wherein the object is a face of a human being.

7. A method of controlling a movable mechanical section, comprising the step of:
    performing pan/tilt driving control on a movable mechanical section having a structure that moves so that an image pickup direction of an image pickup section that obtains an image-pickup image by performing an image pickup operation changes in a pan direction and a tilt direction,
    wherein unit pan operations that are performed in an angular range in the pan direction are performed for the respective two or more different tilt positions with decreasing angle of elevation at the tilt positions, and
    wherein, when a unit pan operation is to be started, the pan position of the movable mechanical section at the start of the unit pan operation is set as the center pan position for the unit pan operation, such that the pan position of the movable mechanical section for the start of the unit pan operation is not determined prior to the start of the pan operation, and such that the angular range of the pan operation is centered about the pan position of the movable mechanical section at the start of the unit pan operation.

8. A non-transitory computer-readable storage unit on which computer-readable instructions of a program are stored, the instructions, when executed by a processor, causing the processor to perform the steps of:
    performing pan/tilt driving control on a movable mechanical section having a structure that moves so that an image pickup direction of an image pickup section that obtains an image-pickup image by performing an image pickup operation changes in a pan direction and a tilt direction, wherein unit pan operations that are performed in an angular range in the pan direction are performed for the respective two or more different tilt positions with decreasing angle of elevation at the tilt positions, and wherein, when a unit pan operation is to be started, the pan position of the movable mechanical section at the start of the unit pan operation is set as the center pan position for the unit pan operation, such that the pan position of the movable mechanical section for the start of the unit pan operation is not determined prior to the start of the pan operation, and such that the angular range of the pan operation is centered about the pan position of the movable mechanical section at the start of the unit pan operation.

* * * * *